United States Patent
Figoli et al.

(10) Patent No.: US 10,372,116 B2
(45) Date of Patent: Aug. 6, 2019

(54) DEVICE FOR MONITORING AND CONTROLLING INDUSTRIAL EQUIPMENT

(71) Applicant: WellAware Holdings, Inc., San Antonio, TX (US)

(72) Inventors: David Figoli, Sugar Land, TX (US); Matthew Harrison, San Antonio, TX (US)

(73) Assignee: WellAware Holdings, Inc., San Antonio, TX (US)

( * ) Notice: Subject to any disclaimer, the term of this patent is extended or adjusted under 35 U.S.C. 154(b) by 239 days.

(21) Appl. No.: 15/473,241

(22) Filed: Mar. 29, 2017

(65) Prior Publication Data

US 2017/0285623 A1 Oct. 5, 2017

Related U.S. Application Data

(60) Provisional application No. 62/318,628, filed on Apr. 5, 2016.

(51) Int. Cl.
*H04W 88/06* (2009.01)
*G05B 19/418* (2006.01)
(Continued)

(52) U.S. Cl.
CPC ... *G05B 19/41855* (2013.01); *G05B 19/0421* (2013.01); *G05B 19/0423* (2013.01);
(Continued)

(58) Field of Classification Search
CPC .......... G05B 19/0423; G05B 19/41855; G05B 19/0421; G05B 2219/25274;
(Continued)

(56) References Cited

U.S. PATENT DOCUMENTS 5,723,844 A * 3/1998 Dow .................. H05B 6/108
166/248
6,973,378 B2 * 12/2005 Yamada .............. G01M 17/007
701/1
(Continued)

FOREIGN PATENT DOCUMENTS

| BG | 1487 U1 | 8/2011 |
| WO | 2017176428 | 10/2017 |
| WO | 2017176429 | 10/2017 |

OTHER PUBLICATIONS

International Preliminary Report on Patentability in International Application No. PCT/US2017/022082, dated Oct. 18, 2018, 10 pages.
(Continued)

*Primary Examiner* — Hai V Nguyen
(74) *Attorney, Agent, or Firm* — Fish & Richardson P.C.

(57) ABSTRACT

Methods, systems, and apparatus, including computer programs encoded on a computer storage medium for communicating between an operational asset and a backend network that include the actions of receiving first data from an operational asset through a first communication interface that is configured to communicate with an operational asset, and where the first data is formatted according to a first data format that is specific to the operational asset. Processing the first data according to an asset template to generate second data, where the second data includes the first data and being formatted according to a second data format that is specific to the backend network. Causing the second data to be transmitted to the backend network by a second communication interface that is configured to communicate with a backend network.

19 Claims, 15 Drawing Sheets

(51) Int. Cl.
*H04L 29/08* (2006.01)
*G05B 19/042* (2006.01)
*G06F 13/40* (2006.01)
*H04M 11/00* (2006.01)
*H04M 11/06* (2006.01)
*H04L 29/06* (2006.01)

(52) U.S. Cl.
CPC .......... *G06F 13/4068* (2013.01); *H04L 67/12* (2013.01); *H04L 67/125* (2013.01); *H04L 69/18* (2013.01); *H04M 11/002* (2013.01); *H04M 11/06* (2013.01); *G05B 2219/25175* (2013.01); *G05B 2219/25274* (2013.01); *H04L 67/02* (2013.01); *H04L 67/42* (2013.01)

(58) Field of Classification Search
CPC .......... G05B 2219/25175; H04L 67/02; H04L 67/12; H04L 67/125; H04L 67/42; H04L 69/18; H04M 11/002; H04M 11/06; G06F 13/4068
USPC .................................. 455/552.1, 553.1, 557
See application file for complete search history.

(56) References Cited

U.S. PATENT DOCUMENTS

| | | | |
|---|---|---|---|
| 7,526,013 B1 | 4/2009 | Myers | |
| 7,758,315 B2 | 7/2010 | Moskun | |
| 8,086,250 B2* | 12/2011 | Janetis | G01S 19/34 455/404.1 |
| 8,270,938 B2* | 9/2012 | Flippo | G01S 19/34 455/127.5 |
| 8,584,146 B1* | 11/2013 | Go | G06F 13/00 719/321 |
| 8,881,177 B2* | 11/2014 | Go | G06F 13/00 719/321 |
| 9,049,207 B2* | 6/2015 | Hugard, IV | H04L 41/12 |
| 9,191,383 B2* | 11/2015 | Trani | H04L 63/08 |
| 9,572,020 B2* | 2/2017 | Brett | H04W 8/245 |
| 9,762,659 B2* | 9/2017 | Koska | H04L 67/10 |
| 9,910,663 B1* | 3/2018 | Biear | H04L 67/34 |
| 2005/0222933 A1 | 10/2005 | Wesby | |
| 2008/0174598 A1* | 7/2008 | Risenhoover | G06F 17/5004 345/419 |
| 2008/0185903 A1 | 8/2008 | Bausov et al. | |
| 2009/0216775 A1* | 8/2009 | Ratliff | H04W 4/029 |
| 2010/0125641 A1 | 5/2010 | Shelby | |
| 2010/0194631 A1* | 8/2010 | Janetis | G01S 19/17 455/456.3 |
| 2011/0031015 A1 | 2/2011 | Downton et al. | |
| 2011/0076984 A1* | 3/2011 | Flippo | G01S 19/17 455/404.2 |
| 2012/0026002 A1 | 2/2012 | Vu et al. | |
| 2012/0274664 A1 | 11/2012 | Fagnou | |
| 2013/0019028 A1* | 1/2013 | Myers | G06F 17/2235 709/246 |
| 2013/0254416 A1 | 9/2013 | Abraham et al. | |
| 2013/0275574 A1* | 10/2013 | Hugard, IV | H04L 41/12 709/224 |
| 2014/0155735 A1* | 6/2014 | Greer | A61B 5/064 600/414 |
| 2014/0223451 A1* | 8/2014 | Go | G06F 13/00 719/321 |
| 2014/0289797 A1* | 9/2014 | Trani | H04L 63/08 726/3 |
| 2014/0355581 A1 | 12/2014 | Pulini et al. | |
| 2015/0081922 A1* | 3/2015 | Brett | H04W 8/245 709/230 |
| 2015/0193418 A1* | 7/2015 | Koska | H04L 67/10 715/223 |
| 2015/0234796 A1* | 8/2015 | Williams | G06F 17/2247 715/229 |
| 2015/0315903 A1* | 11/2015 | Abbassian | E21B 47/06 702/6 |
| 2015/0338315 A1* | 11/2015 | Manahan | G01M 99/008 702/183 |
| 2015/0356482 A1 | 12/2015 | Whipple et al. | |
| 2016/0010445 A1 | 1/2016 | Harrison et al. | |
| 2016/0319826 A1 | 11/2016 | Shanks et al. | |
| 2017/0052518 A1* | 2/2017 | Wang | G05B 19/0423 |
| 2017/0079121 A1* | 3/2017 | Jayawardena | H05B 37/0272 |
| 2017/0285622 A1* | 10/2017 | Figoli | G05B 19/4183 |
| 2017/0289824 A1* | 10/2017 | Figoli | H04W 24/02 |

OTHER PUBLICATIONS

International Preliminary Report on Patentability in International Application No. PCT/US2017/022055, dated Oct. 18, 2018, 8 pages.
International Preliminary Report on Patentability in International Application No. PCT/US2017/022057, dated Oct. 18, 2018, 11 pages.
International Search Report and Written Opinion in International Application No. PCT/US2017/022055, dated Jun. 6, 2017, 11 pages.
International Search Report and Written Opinion in International Application No. PCT/US2017/022057, dated Jun. 6, 2017, 14 pages.
International Search Report and Written Opinion in International Application No. PCT/US2017/022082, dated Jun. 2, 2017, 18 pages.
U.S. Non Final Office Action in U.S. Appl. No. 15/473,196, dated Dec. 13, 2018, 10 pages.
U.S. Non Final Office Action in U.S. Appl. No. 15/473,234, dated Nov. 23, 2018, 16 pages.

* cited by examiner

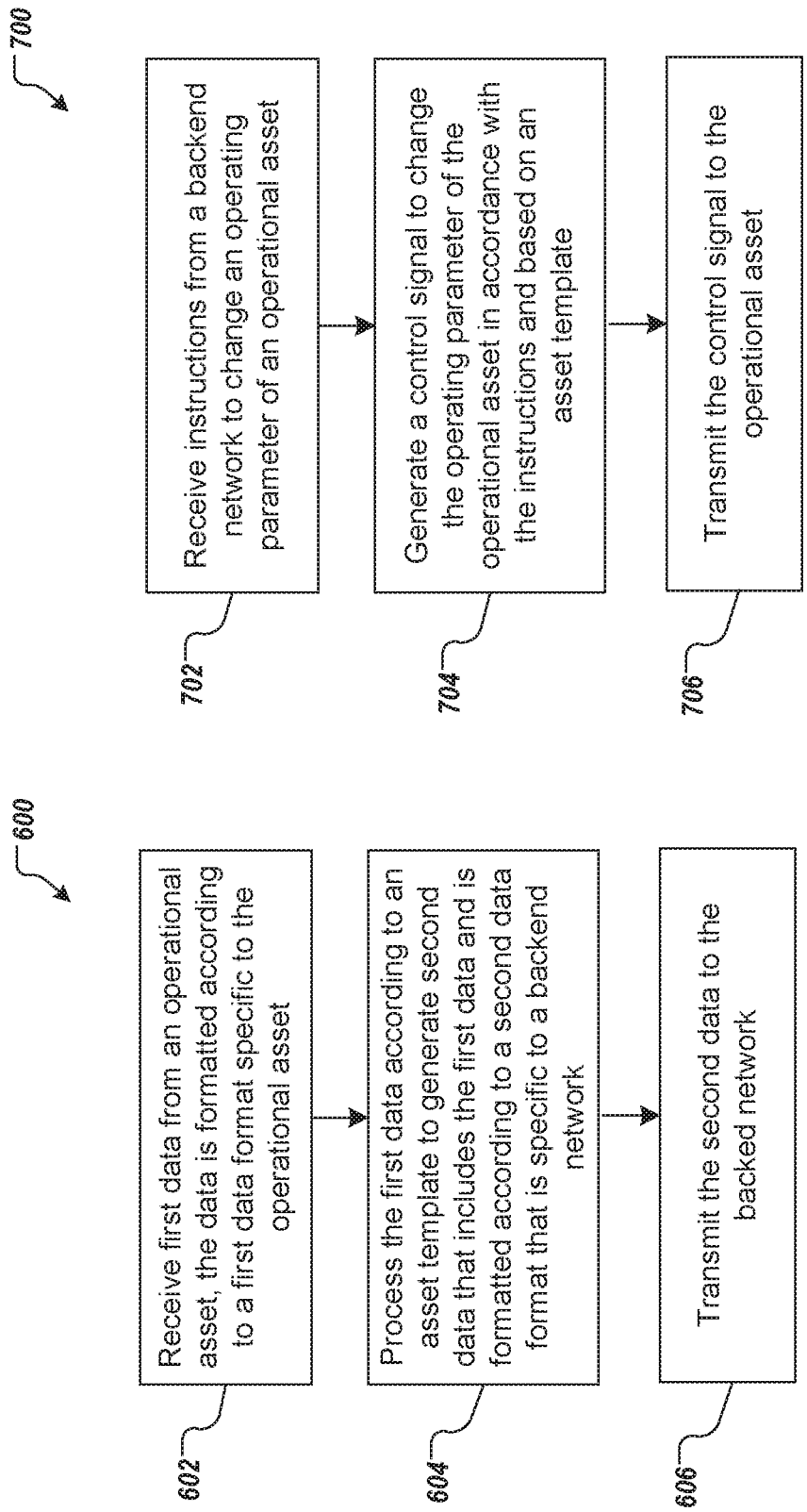

DEVICE FOR MONITORING AND CONTROLLING INDUSTRIAL EQUIPMENT

CROSS-REFERENCE TO RELATED APPLICATION

This application claims the benefit of the filing date of U.S. Provisional Application No. 62/318,628, filed on Apr. 5, 2016. The contents of U.S. Application No. 62/318,628 are incorporated herein by reference in their entirety.

BACKGROUND

Oil and gas production assets are often distributed across remote locations. For example, well-sites can be remote from conventional communications equipment, making the retrieval of well-site data difficult and unreliable. Moreover, even obtaining data from and controlling operational assets remotely (e.g., through network communications) can be challenging, because well-sites may lack network communications infrastructure, or have insufficient network resources (e.g., bandwidth). Furthermore, many operational assets (e.g., sensors and equipment) have little or no local intelligence, and thus, rely on a backend network for data gathering and control operations.

SUMMARY

This specification relates to systems and methods for monitoring and controlling industrial equipment. More specifically, the specification relates systems and methods for adding a level of local intelligence to industrial equipment. In addition, the specification relates to a modular network edge device for monitoring and controlling industrial equipment.

Implementations of the present disclosure generally relate to systems and methods of operation for a configurable network edge device. More particularly, implementations of the present disclosure provide a network edge device that can interface between a backend network and one or more operational assets (e.g., industrial sensors and operational equipment). For example, the network edge device can be configured to interface between a backend network and an operational asset, while permitting the backend network to be agnostic to the particular communication protocols and data formats of the asset. Furthermore, the network edge device itself can be agnostic to communication protocols of both the backend network and the operational asset such that the network edge device is configurable to interface between various operational assets and backend networks using various network communication protocols. In some examples, an asset template is used to configure a network edge device to interface with a particular operational asset and backend network. For example, an asset template can define interfacing protocols between a particular operational asset (e.g., a variable pump) and a backend network.

In general, innovative aspects of the subject matter described in this specification can be embodied in methods for communicating between an operational asset and a backend network that include the actions of receiving first data from an operational asset through a first communication interface that is configured to communicate with an operational asset, and where the first data is formatted according to a first data format that is specific to the operational asset. Processing the first data according to an asset template to generate second data, where the second data includes the first data and being formatted according to a second data format that is specific to the backend network. Causing the second data to be transmitted to the backend network by a second communication interface that is configured to communicate with a backend network. This and other implementations can each optionally include one or more of the following features.

In some implementations, the methods can include receiving, from the second communication interface, instructions from the backend network to change an operating parameter of the operational asset. Generating a control signal to change the operating parameter of the operational asset in accordance with the instructions based on the asset template, where the control signal is formatted according to a control format specific to the operational asset. Causing the control signal to be transmitted to the operational asset by the first communication interface.

In some implementations, the first data format includes a digital data format specific to the operational asset.

In some implementations, receiving the first data includes receiving a portion of the first data at each of a plurality of first time intervals, and the methods can include storing each portion of the first data, where the second data is caused to be transmitted at an end of a second time interval, the second time interval being of a longer period of time than each of the first time intervals.

In some implementations, the methods can include causing the network edge device to enter a low power mode between each of the first time intervals.

In some implementations, the methods can include determining to change an operating parameter of the operational asset based on the first data and the asset template. Generating a control signal to change the operating parameter of the operational asset in accordance with the asset template, where the control signal is formatted according to a control format specific to the operational asset. Causing the control signal to be transmitted to the operational asset by the first communication interface.

In some implementations, the second data includes an indication that the network edge device changed the operating parameter of the operational asset.

In some implementations, the network edge device can be operating in a first mode in which changes to operating parameters of the operational asset are controlled by instructions from the backend network. The methods can include determining that communications with the backend network have been lost, and shifting the network edge device to operate in a second mode in changes to operating parameters of the operational asset are controlled by the network edge device in accordance with the asset template.

In some implementations, the asset template can identify the first data format for data received from the operational asset, the second data format for data to be sent to the backend network, a control signal format of control signals for controlling operating parameters the operational asset, criteria for controlling operating parameters of the operational asset, and alarm values associated with parameters of the operational asset.

In some implementations, the methods can include performing an analysis on the first data to generate a result, and wherein the second data includes the result.

In some implementations, the analysis can be one of filtering the first data, performing a fast Fourier transform (FFT) on the first data, or comparing the first data to alarm limits.

In some implementations, the methods can include obtaining a geographic location of the network edge device, where the second data includes data identifying the geographic location of the network edge device.

In another general, innovative aspects of the subject matter described in this specification can be embodied in methods for configuring a network edge device for communicating between an operational asset and a backend network that include the actions of establishing communication with a backend network through a first network connection. Establishing communication with a user computing device through a second, different network connection. Receiving an asset template that identifies communication protocols of the backend network and communication protocols of an operational asset to which the network edge device is coupled. Sending registration data to the backend network to register the network edge device and the operational asset with the backend network in response to receiving an instruction from the user computing device. This and other implementations can each optionally include one or more of the following features.

In some implementations, the asset template can facilitate communication between the operational asset and the backend network while permitting the operational asset to be agnostic to communication protocols of the backend network and permitting the backend network to be agnostic to the communication protocols of the operational asset. In some implementations, the asset template is received from the backend network. In some implementations, the asset template is received from the user computing device.

In some implementations, the first network connection is one of a cellular network connection, a satellite network connection, or a random phase multiple access (RPMA) network connection, and wherein the second network connection is a low-power local network connection.

In some implementations, the methods can include sending data from the operational asset to the user computing device.

In some implementations, the data includes data for displaying measurement data from the operational asset in a graphical user interface in a graphical representation of an analog gauge or digital meter display.

In some implementations, the methods can include receiving, from the user computing device, user input to view the data from the operational asset in a different format; and sending, to the user computing device, the data from the operational asset in the different format.

In some implementations, the different format is a different level of abstraction for the data. In some implementations, the different format is a voltage or current measurement from a sensor of the operational asset.

In some implementations, the methods can include sending data from the operational asset to the backend network after registering with the backend network.

In some implementations, the registration data includes a code or password.

In some implementations, the methods can include determining a type of the operational asset; and requesting an asset template that is specific to the determined type of the operational asset.

In some implementations, the methods can include receiving user input to customize asset template; and modifying the asset template in accordance with the user input from the user computing device.

In another general aspect, the subject matter described in this specification can be embodied in a network edge device that includes a housing and a control board inside the housing. The control board includes one or more processors, a memory device coupled to the one the one or more processors, a wiring bay, and a communication interface port. The wiring bay includes a plurality of different types of wiring interfaces for connecting an operational asset to the network edge device. The wiring interfaces are coupled to the one or more processors. The communication interface port is coupled to the one or more processors and is configured to receive a detachable radio frequency (RF) modem board that includes one of two or more different types of RF modems. The memory device has instructions stored thereon for execution by the one or more processors. The instructions can cause the one or more processors perform the operations of automatically identifying a type of an RF modem on an RF modem board that is connected to the communication interface port, and communicating with the RF modem according to a communication protocol specific to the type of the RF modem. This and other implementations can each optionally include one or more of the following features.

In some implementations, the instructions cause the one or more processors perform the operations of any one or more of the above methods for communicating between an operational asset and a backend network In some implementations, the instructions cause the one or more processors perform the operations of any one or more of the above methods for configuring a network edge device for communicating between an operational asset and a backend network.

The device of claim 1, wherein the control board is configured to receive a detachable battery module.

In some implementations, the two or more different types of RF modems includes a satellite modem, a cellular modem, and a random phase multiple access (RPMA) modem.

In some implementations, the plurality of wiring interfaces include a serial data communication interface, an analog signal input interface, an analog signal output interface, and a digital signal input interface.

In some implementations, the plurality of wiring interfaces include serial data communication interfaces, an analog current signal input interface, an analog current signal output interface, an analog voltage signal input interface, a pulse signal input interface, a digital signal input interface, and a temperature sensor input interface.

In some implementations, the serial data communication interface is one of a RS485 interface or a RS232 interface.

In some implementations, the control board includes an input/output expansion port for receiving a detachable input/output expansion board.

In some implementations, the input/output expansion board includes a motor controller.

In some implementations, the housing includes a threaded mount for receiving a wiring conduit.

In some implementations, the housing includes a threaded mount for receiving an antenna.

In some implementations, the network edge device meets a National Electric Code (NEC) classification for an explosion proof device in an explosive gas area.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 6 depicts an example process for facilitating data communications between an operational asset and a backend network that can be executed in accordance with implementations of the present disclosure.

FIG. 7 depicts an example process for facilitating control of an operational asset by a backend network that can be executed in accordance with implementations of the present disclosure.

DETAILED DESCRIPTION

Figure 1:
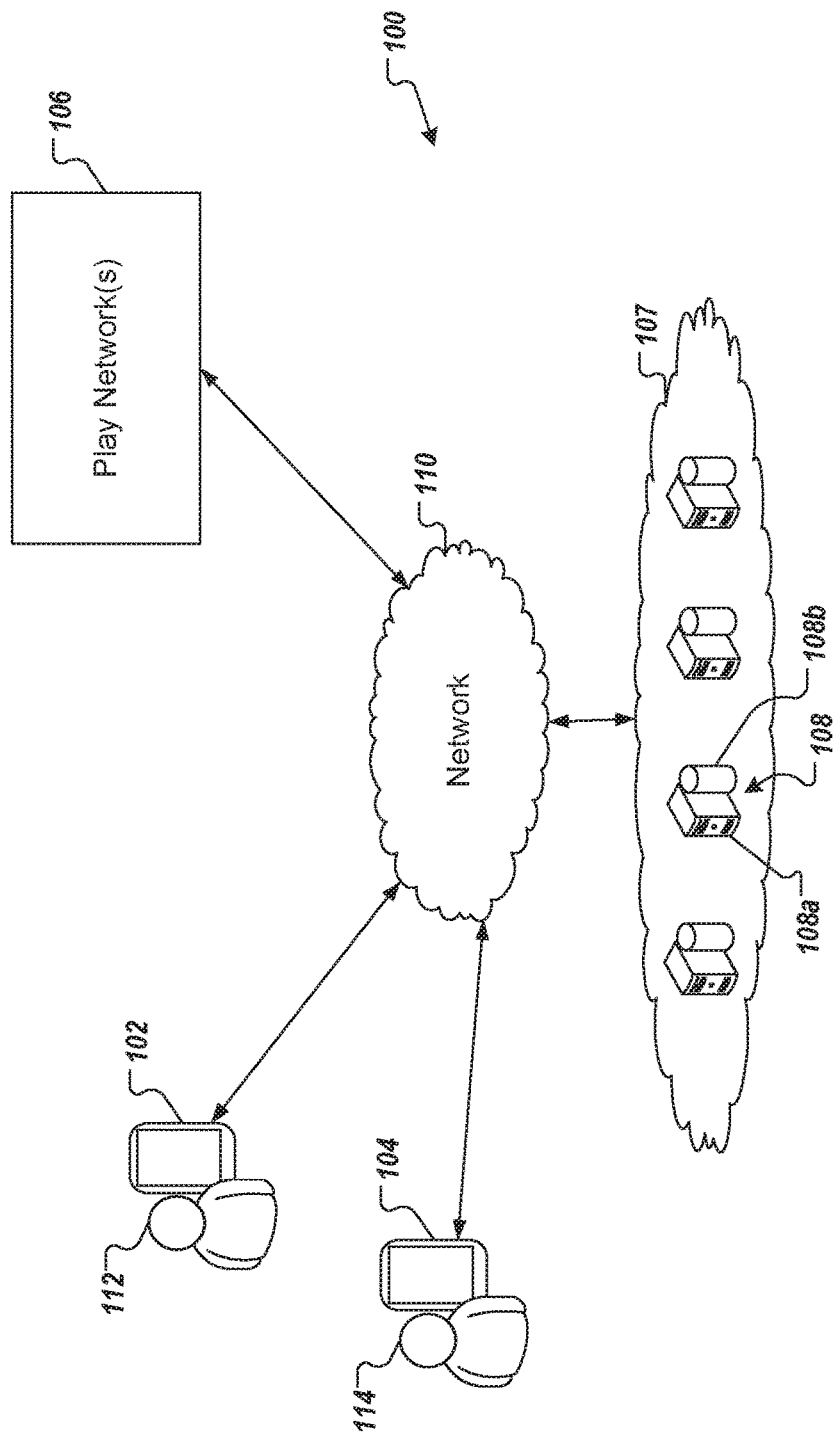
FIG. 1 depicts an example system in accordance with implementations of the present disclosure.

Implementations of the present disclosure generally relate to systems and methods of operation for a configurable network edge device. More particularly, implementations of the present disclosure provide a network edge device that can interface between a backend network and one or more operational assets (e.g., industrial sensors and operational equipment). For example, the network edge device can be configured to interface between a backend network and an operational asset, while permitting the backend network to be agnostic to the particular communication protocols and data formats of the asset. Likewise, the network edge device can also be configured such that operational asset can be agnostic to the particular communication protocols and data formats of the backend network. Furthermore, the network edge device itself can be agnostic to communication protocols of both the backend network and the operational asset such that the network edge device is configurable to interface between various operational assets and backend networks using various network communication protocols. In some examples, an asset template is used to configure a network edge device to interface with a particular operational asset and backend network. For example, an asset template can define interfacing protocols between a particular operational asset (e.g., a variable pump) and a backend network.

In some implementations, a network edge device can provide autonomous "real-time" control of an operational asset apart from a backend network. In some examples, a network edge device can provide autonomous "real-time" control of an operational asset apart from a backend network. For example, such autonomous control may provide more efficient use of network infrastructure resources and improve the remote control capabilities of the operational asset by minimizing or eliminating network latency delays.

In some implementations, a network edge device can operate in a variety of operating modes. For example, the operating modes vary from permitting compete monitoring and control of an operational asset by a backend network to making only periodic data reports to the backend network, while mainlining autonomous data monitoring and control of an operational asset at the network edge device. In some examples, a network edge device can shift between operating modes at the command of the backend network. In some examples, a network edge device can shift between operating modes automatically, for example, upon detecting an abnormal network condition (e.g., loss of or degraded communications with the backend network). In some examples, a network edge device can shift between operating modes automatically, for example, upon detecting an abnormal power condition (e.g., loss of or reduced power).

In some implementations, a network edge device can be remotely upgradable. For example, a backend network can provide software upgrades (e.g., upgrades to a network edge device's firmware, operating system, and/or asset template(s)). In some implementations, a network edge device includes location detection capabilities. For example, a network edge device can include a GPS receiver to track the location of the network edge device and, by extension, the associated operational asset.

In some implementations, a network edge device includes power saving features. For example, a network edge device can be configured to enter a low power mode when not performing data monitoring or asset control operations. For example, in a low power mode all nonessential components may be powered down. In some examples, the network edge device may power down all components except an interval timer or interrupt circuit to trigger the network edge device to transition out of the low power mode.

Implementations of the present disclosure also relate to methods for initializing a configurable network edge device for monitoring and controlling an operational asset. More particularly, implementations of the present disclosure provide a method for initializing communications between a network edge device and an operational asset coupled to the network edge device. For example, a network edge device can be configured to communicate with a backend network and an operation asset while permitting the backend network and the operational asset to each remain agnostic to the communication protocols of the other. The network edge device can be configured with an asset template that identifies communication protocols of the backend network and the operational asset. In some examples, the asset template includes operating requirements for the operational asset and the network edge device. In some examples, the network edge device can be configured using a user computing device (e.g., a tablet computer) in communication with the network edge device over a separate communication network from the communication network through which the network edge device communicates with the backend network.

In some implementations, the asset template can be modified based on user input to the user computing device. For example, a network template that is general to pumps can be modified to include communication protocols or operational requirements of a particular pump model or operational requirements for pumps a particular industrial site. In other words, the asset template can be modified to accommodate characteristics of a particular operational asset or to accommodate specific operations at a particular site.

In some implementations, proper operation of the network edge device can be verified by sending data from the operation asset to the user computing device. For example, the network edge device can stream data to the user computing device to verify proper operation before transmitting the data to the backend network, thereby, reducing the potential that the backend network may waste resources on improper data. In some implementations, the network edge device can permit a user to troubleshoot improper operation by allowing the user to inspect the data at various levels of abstraction. For example, the network edge device can provide the data to the user computing device in various different formats that allows a user to step through the data processing performed by the network edge device to find and correct an error.

Implementations of the present disclosure will be discussed in further detail with reference to an example context. The example context includes oil and gas well-sites. It is appreciated, however, that implementations of the present disclosure can be realized in other appropriate contexts, for example, a chemical plant, a fertilizer plant, tank batteries (located away from a site), above-ground appurtenances (pipelines) and/or intermediate sites. An example intermediate site can include a central delivery point that can be located between a site and a refinery, for example. Within the example context, implementations of the present disclosure are discussed in further detail with reference to an example sub-context. The example sub-context includes a production well-site. It is appreciated, however, that implementations of the present disclosure can be realized in other appropriate sub-contexts, for example, an exploration well-site, a configuration well-site, an injection well-site, an observation well-site, and a drilling well-site.

In the example context and sub-context, well-sites can be located in natural resource plays. A natural resource play can be associated with oil and/or natural gas. In general, a natural resource play includes an extent of a petroleum-bearing formation, and/or activities associated with petroleum development in a region. An example geographical region can include southwestern Texas in the United States, and an example natural resource play includes the Eagle Ford Shale Play.

As used herein the term "real time" refers to transmitting or processing data without intentional delay given the processing limitations of the system, the time required to accurately measure the data, and the rate of change of the parameter being measured. For example, "real time" operations should be capable of capturing appreciable changes in a parameter measured by a sensor, processing the data to determine whether to perform an action based on the data, and transmitting control signals to perform the action without intentional delay, and within sufficient time for an operational asset to receive and respond to the control signals prior to a significant change in the measured parameter. For instance, a "real-time" operation for a slowly changing parameter (e.g., liquid level in a tank) may be one that measures, processes, and transmits control signals to an associated pump or electronically controlled valve every hour (or longer) if the parameter (e.g., tank level) only changes appreciably in an hour (or longer). However, a "real-time" operation for a rapidly changing parameter (e.g., well head pressure) may be one that measures, processes, and transmits control signals to an associated well pump motor every minute (or more often) if the parameter (e.g., well head pressure) changes appreciably in a minute (or more often).

FIG. 1 depicts an example system 100 that can execute implementations of the present disclosure. The example system 100 includes one or more computing devices, such as computing devices 102, 104, one or more play networks 106, and a backend network 107 that includes one or more computing systems 108. The example system 100 further includes a network 110. The network 110 can include a large computer network, such as a local area network (LAN), wide area network (WAN), the Internet, a cellular network, a satellite network, a mesh network (e.g., 900 Mhz), one or more wireless access points, or a combination thereof connecting any number of mobile clients, fixed clients, and servers. In some examples, the network 110 can be referred to as an upper-level network.

The computing devices 102, 104 are associated with respective users 112, 114. In some examples, the computing devices 102, 104 can each include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. The computing systems 108 can each include a computing system 108a and computer-readable memory provided as a persistent storage device 108b, and can represent various forms of server systems including, but not limited to a web server, an application server, a proxy server, a network server, or a server farm.

In some implementations, and as discussed in further detail herein, site data (e.g., oil data and/or gas data) can be communicated from one or more of the play networks 106 to the computing systems 108 of the backend network 107 over the network 110. In some examples, each play network 106 can be provided as a regional network. For example, a play network can be associated with one or more plays within a geographical region. In some examples, each play network 106 includes one or more sub-networks. As discussed in further detail herein, example sub-networks can include a low power data sub-network, e.g., a low power machine-to-machine data network (also referred to as a smart data network and/or an intelligent data network, one or more wireless sub-networks, and mesh sub-networks, e.g., 900 Mhz.

In some examples, the computing systems 108 store the well data and/or process the well data to provide auxiliary data. In some examples, the well data and/or the auxiliary data are communicated over the play network(s) 106 and the network 110 to the computing devices 102, 104 for display thereon. In some examples, user input to the computing devices 102, 104 can be communicated to the computing systems 108 over the network 110.

In general, monitoring of well-sites can include oil well monitoring and natural gas well monitoring (e.g., pressure(s), temperature(s), flow rate(s)), compressor monitoring (e.g., pressure, temperature), flow measurement (e.g., flow rate), custody transfer, tank level monitoring, hazardous gas detection, remote shut-in, water monitoring, cathodic protection sensing, asset tracking, water monitoring, access monitoring, alarm monitoring, monitoring operational parameters (e.g., operating speed), and valve monitoring. In some examples, monitoring can include monitoring the presence and concentration of fluids (e.g., gases, liquids). In some examples, monitoring can include environmental monitoring such as weather conditions, seismic measurements, well bore configuration, surface conditions, downhole conditions, presence of volatile organic compounds (VOCs). In some examples, monitoring can include equipment operational status monitoring such as method of artificial lift, age, or other properties of a well in order to model and predict the useful life/failure rate of given equipment type. In some examples, control capabilities can be provided, such as remote valve control, remote start/stop capabilities, remote access control.

Figure 2:
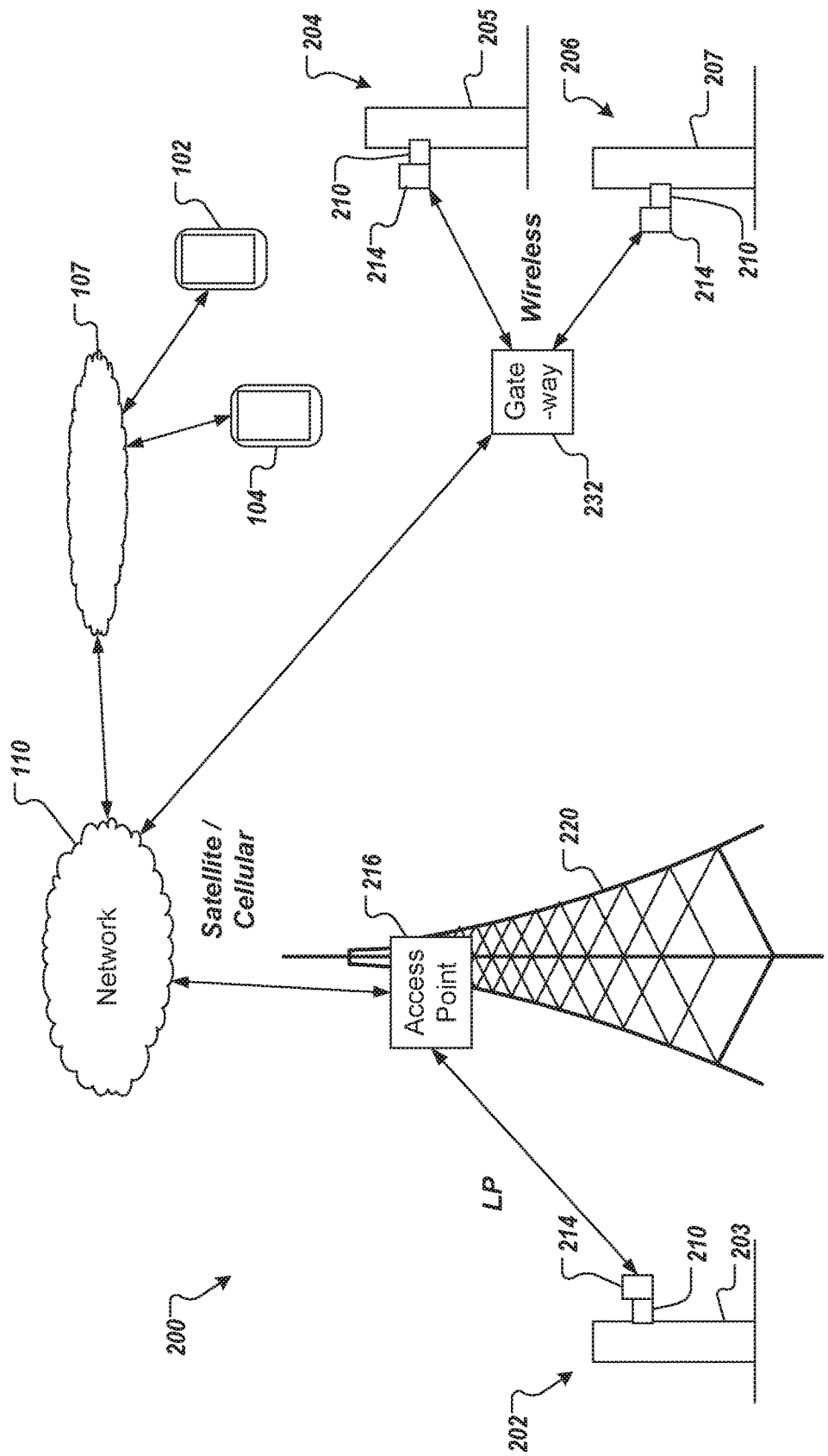
FIG. 2 depicts an example portion of a play network.

FIG. 2 depicts an example portion of an example play network 200. The example play network 200 provides low power (LP) communication, e.g., using a low power data network, and cellular and/or satellite communication for well data access and/or control. In some examples, as discussed herein, LP communication can be provided by a LP network. In the example of FIG. 2, a first well-site 202, a second well-site 204 and a third well-site 206 are depicted. Although three well-sites are depicted, it is appreciated that the example play network 200 can include any appropriate number of well-sites. In the example of FIG. 2, well monitoring and data access for the well-site 202 is provided using LP communication and cellular and/or satellite communication, and well monitoring and data access for the well-sites 204, 206 is provided using cellular, satellite, and/or mesh network communication.

The example of FIG. 2 corresponds to the example context and sub-context (a production well-site) discussed above. It is appreciated, however, that implementations of the present disclosure. In the depicted example, the well-site 202 includes a wellhead 203, a sensor system 210, and network edge devices 214. In some examples, the sensor system 210 includes a wireless network edge devices 214 that is connected to one or more sensors, the one or more sensors monitoring parameters associated with operation of the wellhead 203. In some examples, the wireless network edge devices 214 enables monitoring of discrete and analog signals directly from the connected sensors and/or other signaling devices. In some examples, the sensor system 210 generates data signals that are provided to the network edge devices 214, which can forward the data signals. In some examples, the sensor system 210 can provide control functionality (e.g., valve control). Although a single sensor system 210 is depicted, it is contemplated that a well-site can include any appropriate number of sensor systems 210 and network edge devices 214.

Well data and/or control commands can be provided to/from the well-site 202 through an access point 216. More particularly, information can be transmitted between the access point 216, the sensor system 210, and/or the network edge devices 214 based on LP network. In some examples, LP network provides communication using a globally certified, license free spectrum (e.g., 2.4 GHz). In some examples, the access point 216 provides a radial coverage that enables the access point 216 to communicate with numerous well-sites, such as the well-site 202. In some examples, the access point 216 further communicates with the network 110 using cellular, satellite, mesh, point-to-point, point-to-multipoint radios, and/or terrestrial or wired communication.

In the depicted example, the access point 216 is mounted on a tower 220. In some examples, the tower 220 can include an existing telecommunications or other tower. In some examples, an existing tower can support multiple functionalities. In this manner, erection of a tower specific to one or more well-sites is not required. In some examples, one or more dedicated towers could be erected.

In the depicted example, the well-sites 204, 206 include respective wellheads 205, 207, and respective sensor systems 210 (discussed above). Although a single sensor system 210 is depicted for each well-site 204, 206, it is contemplated that a well-site can include any appropriate number of sensor systems 210. In some examples, well data and/or control commands can be provided to/from the well-sites 202 through a gateway 232. More particularly, information can be transmitted between the gateway 232, and the sensor systems 210 can be wireless communication (e.g., radio frequency (RF)). In some examples, the gateway 232 further communicates with the network 110 using cellular and/or satellite communication.

In accordance with implementations of the present disclosure, well-site control and/or data visualization and/or analysis functionality (e.g., hosted in the backend network 107 of FIGS. 1 and 2) and one or more play networks (e.g., the play networks 106, 200 of FIGS. 1 and 2) can be provided by a service provider. In some examples, the service provider provides end-to-end services for a plurality of well-sites. In some examples, the service provider owns the one or more play networks and enables well-site operators to use the play networks and control/visualization/monitoring functionality provided by the service provider. For example, a well-site operator can operate a plurality of well-sites. The well-site operator can engage the service provider for well-site control/visualization/monitoring services (e.g., subscribe for services). In some examples, the service provider and/or the well-site operator can install appropriate sensor systems, network edge devices and/or gateways (e.g., as discussed above with reference to FIG. 2). In some examples, sensor systems, network edge devices and/or gateways can be provided as end-points that are unique to the well-site operator.

In some implementations, the service provider can maintain one or more indices of end-points and well-site operators. In some examples, the index can map data received from one or more end-points to computing devices associated with one or more well-site operators. In some examples, well-site operators can include internal server systems and/or computing devices that can receive well data and/or auxiliary data from the service provider. In some examples, the service provider can receive messages from well-sites, the messages can include, for example, well data and an end-point identifier. In some examples, the service provider can route messages and/or auxiliary data generated by the server provider (e.g., analytical data) to the appropriate well-site operator or personnel based on the end-point identifier and the index. Similarly, the service provider can route messages (e.g., control messages) from a well-site operator to one or more appropriate well-sites.

Figure 3:
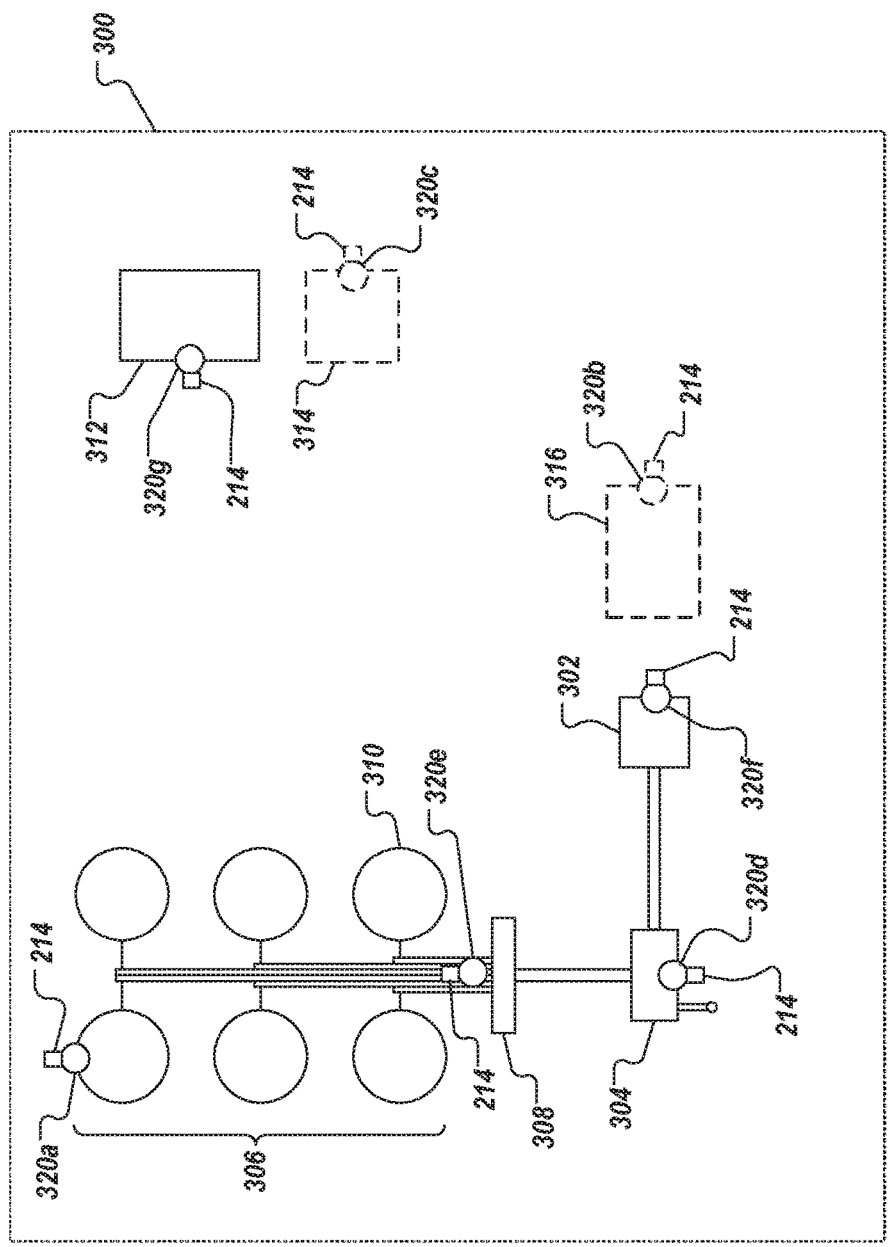
FIG. 3 depicts a representation of an example well-site.

FIG. 3 depicts a representation of an example well-site 300. The example well-site 300 can include a production well-site, in accordance with the example sub-context provided above. In the depicted example, the well-site 300 includes a well-head 302, an oil and gas separator 304 and a storage tank system 306. In the depicted example, the storage tank system 306 includes a manifold 308 and a plurality of storage tanks 310. The example well-site 300 further includes a base station 312. In some examples, the well-site 300 can include a local weather station 314. In some examples, the well-site 300 can include artificial lift equipment 316, e.g., to assist in extraction of oil and/or gas from the well.

In some examples, the well-site 300 includes one or more operational assets 320a-320g that are part of the sensor network discussed above in reference to FIG. 2. In some examples, an operational asset can be provided as a sensor or cluster of sensors. Example sensors can include fluid sensors, but is not limited to, gas sensors, temperature sensors, pressure sensors, voltage meters and/or amp meters. Each sensor is responsive to a condition, and can generate a respective signal based thereon. In some examples, an operational asset 320a-320g can be provided as well-site equipment. Example well-site equipment can include, but is not limited to, pumps, compressors, motors, relays, switches, and/or remotely operable valve(s) along with associated sensors.

Each item of an operational asset includes a communication interface for receiving data from the asset (e.g., sensors) and/or controlling the asset (e.g., well-site equipment). In some examples, an operational asset can include a computer-based interface for monitoring sensor data and controlling the operation of associated equipment. For example, a computer-based interface may include a processor and a data input/output interface (e.g., a serial data connection). In some examples, a communication interface for an operational asset can include analog data outputs of a sensor or analog controllers that control the operation of the equipment. The most basic communication interface may be a cable which transmits a voltage or current signal representative of a sensor measurement or a relay input for controlling power to a piece of equipment (e.g. a valve).

As discussed herein, operational assets 320a-320g can be coupled to a network edge device 214 to provide data to a backend network 107 for processing. For example, data can be provided through a play network, e.g., the play network(s) 106 of FIG. 1, to a backend network 107. The backend network 107 can process the sensor data to control operations of the operational assets 320a-320g. Further, the backend network 107 sends instructions for controlling the operational assets 320a-320g to the network edge devices 214, which, in-turn provide appropriate control signals to the operational assets 320a-320g, as discussed in more detail herein.

Figure 4:
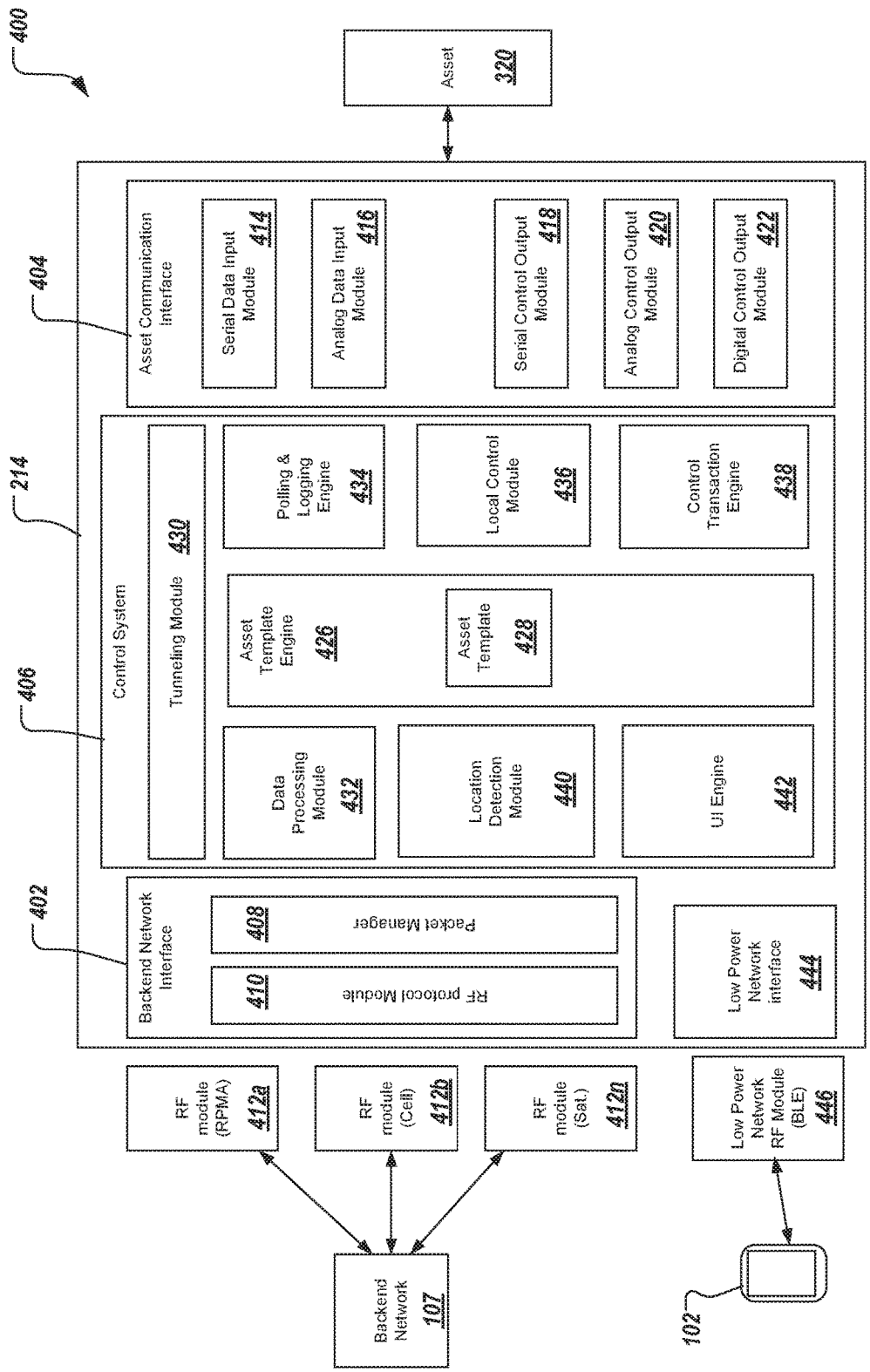
FIG. 4 depicts an example system architecture for a network edge device in accordance with implementations of the present disclosure.

FIG. 4 depicts an example system architecture 400 for a network edge device 214 in accordance with implementations of the present disclosure. The system architecture 400 for the network edge device 214 includes a backend network interface 402, an asset communication interface 404, and a control system 406. As discussed herein, the backend network interface 402 interfaces with a backend network 107 to transmit and receive data and commands according to network communication protocols specific to the backend network. The backend network interface 402 permits communications between the network edge device 214 and the backend network to be agnostic of a particular operational asset 320 to which the network edge device 214 is connected. The asset communication interface 404 interfaces with the operational asset 320 to receive data and transmit commands according to particular communication or signaling protocols of the operational asset 320. The control system 406 facilitates data communications between the backend network 107 and the operational asset 320, and can provide autonomous control of some operational assets 320.

In the depicted example, the backend network interface 402 includes a packet manager 408 and a radio frequency (RF) protocol module 410. In some examples, the backend network interface 402 is provided as one or more computer-executable programs that can be executed using one or more processors or controllers.

In some examples, the packet manager 408 is a component of the backend network interface 402 that provides data packetization and data normalization functions according to protocols of the backend network 107 to make data delivery to the backend network agnostic from the point of view of the operational asset 320. For example, the packet manager 408 encapsulates asset data for transmission to the backend network 107 in proper packet formats specific to the backend network 107. In addition, the packet manager 408 can extract asset agnostic commands from the data packets received by the network edge device 214 according to proper packet formats. In some examples, the asset template 428, described in more detail below, can be used to determine proper packet formatting.

In some examples, the RF protocol module 410 is a component of the backend network interface 402 that provides RF connectivity to the backend network 107 through one or more wide area networks (WAN). For example, the RF protocol module 410 negotiates network protocols with a network access point (e.g., a cell tower, satellite, WiFi access point) to establish communications between the network edge device 214 and the backend network 107 through a WAN (e.g., the Internet, a cellular network, a satellite network, a mesh network (e.g., 900 Mhz), one or more wireless access points, or a combination thereof).

In some examples, the RF protocol module 410 interfaces with one or more RF modules 412a-412n. RF modules 412a-412n can be hardware or software radio modules (e.g., modems) that perform the RF communications with a network access point. Example RF modules include, but are not limited to, a random phase multiple access (RPMA) RF module 412a, a cellular communication RF module 412b (e.g., LTE or 4G), and a satellite communication RF module 412n. In some examples, an RF protocol module 410 can interface with multiple RF modules 412a-412n concurrently.

For example, a network edge device 214 can communicate with a backend network 107 through multiple RF networks concurrently. In some examples, a network edge device 214 can be configured to use one RF module (e.g., RF module 412*a*) for a primary communications channel and other RF modules (e.g., RF module 412*b*, 412*n*) for backup communication channels.

In the depicted example, the asset communication interface 404 includes multiple data input modules 414, 416 and control output modules 418, 420, 422. By way of a non-limiting example, an asset communication interface 404 can include a serial data input module 414, an analog data input module 416, a serial control output module 418, an analog control output module 420, and a digital control output module 422. In some examples, the asset communication interface 404 is provided as one or more computer-executable programs that can be executed using one or more processors or controllers.

In some examples, the data input modules 414, 416 are components of the asset communication interface 404 that enable data to be received from an operational asset 320 according to protocols of the operational asset 320, and make data delivery to the backend network 107 agnostic from the point of view of the operational asset 320. For example, the serial data input module 414 can include one or more serial data connections (e.g., RS232, RS485, RJ45 (TCP/IP interfaces), Control Area Network (CAN) bus interfaces) and appropriate hardware or software for establishing communications with operational assets 320 in accordance with particular serial communications protocols (e.g., signal timing, data line wakeup signals, data rate, and data packet formats) of the operational assets 320. For example, the serial data input module 414 can be used to interface with an operational asset that has a computer-based interface or control system (e.g., electronic gas flow meters, programmable logic controllers (PLC), remote terminal units (RTU), diesel generators, diesel engines powering compressors, hazardous gas monitors, variable speed drives, pump controllers, liquid asset custody transfer units (LACT), engine control units (ECU), etc.). The analog data input module 416 can include wiring connections and appropriate hardware or software for establishing communications with operational assets 320 in accordance with particular analog signaling protocols (e.g., analog voltage and current levels) of the operational assets 320. For example, the analog data input module 416 can be used to interface with an operational asset that outputs analog data signals (e.g. analog pressure, temperature, or fluid level sensors).

In some examples, the control output modules 418, 420, 422 are components of the asset communication interface 404 that enable the communication of data or commands to an operational asset 320 according to protocols of the operational asset 320, and make remote control of the operational asset 320 agnostic from the point of view of the backend network 107. For example, the serial control output module 418 can include one or more serial data connections (e.g., RS232, RS485, RJ45 (TCP/IP interfaces), Control Area Network (CAN) bus interfaces) and appropriate hardware or software for establishing communications with operational assets 320 in accordance with particular serial communications protocols (e.g., signal timing, data line wakeup signals, data rate, and data packet formats) of the operational assets 320. For example, the serial control output module 418 can be used to interface with an operational asset that has a computer based interface or control system. The analog control output module 420 can include wiring connections and appropriate hardware or software for sending analog control signals to operational assets 320 in accordance with analog control signaling protocols (e.g., analog voltage and current levels) of the operational assets 320. For example, the analog control output module 420 can be used to interface with an operational asset that is controlled by analog control signals (e.g. variable speed pumps). The digital control output module 422 can include wiring connections and appropriate hardware or software for sending digital control signals to operational assets 320 in accordance with analog control signaling protocols (e.g., on/off switching or pulse width modulated (PWM) signals) of the operational assets 320. For example, the digital control output module 420 can be used to interface with an operational asset that is controlled by digital control signals (e.g. relays, solenoid-operated valves, power-switching circuits).

In some implementations, the serial data input module 414 and serial control output module 418 can be integrated into one serial data module, for example, in a duplex communication system. In some examples, the two serial data modules 414, 418 can each be duplex serial communication modules, for example, one can be an RS232 communication module and the other can be an RS485 communication module.

In the depicted example, the control system 406 includes a template engine 426, a tunneling module 430, a data processing module 432, a polling & logging engine 434, a local control module 436, a control transaction engine 438, a location detection module 440, and a user interface (UI) engine 442. In some examples, the control system 406 is provided as one or more computer-executable programs that can be executed using one or more processors or controllers. In some examples, the control system 406 is provided as one or more computer-executable programs that can be executed using one or more processors or controllers.

In some examples, the template engine 426 is a component of the control system 406 that enables communications between a backend network 107 and an operational asset 320 while permitting each of the backend network 107 and the operational asset 320 to provide data or commands that are agnostic to the particular formats of each other. In short, the template engine 426 translates operational asset agnostic instructions from a backend network 107 to control an operational asset 320, and translates backend network agnostic data from the operational asset 320 for transmission to the backend network 107. Furthermore, the template engine 426 can be configured for operation with a range of different operational assets 320 by loading an appropriate asset template 428.

For example, the backend network 107 can provide operational asset agnostic instructions to increase a fluid flow in a system. The template engine 426 can receive the instructions and can translate the instructions to an appropriate voltage signal or serial data signal to be provided to a pump controller in accordance with the asset template 428 associated with the pump, or to a valve solenoid in accordance with the asset template 428 associated with a valve control. For example, the asset template 428 may include voltage or current control signal data for the pump that can be used to translate the desired speed into a voltage or current signal. In this manner, the same instructions can be provided to various operational assets to execute the desired control functions.

As another example, the operational asset 320 can provide data in a backend network agnostic data format (e.g., sensor data). The template engine 426 can receive the data and can translate the data format (e.g., a sensor voltage) to an appropriate data format (e.g., digital data values or a table of a series of data values), in accordance with the asset template 428 associated with the operational asset 320, and to be provided to the backend network 107. For example, the asset template 428 may include voltage level curves for a pressure sensor that relate a voltage data signal to particular pressure values. In this manner, the data from various operational assets 320 can be provided to a backend network 107 according to a unified data format for the backend network 107.

In some implementations, an asset template 428 can identify various operational asset 320 characteristics. For example, an asset template 428 can identify characteristics including, but not limited to, data formats used by an operational asset, control signaling schemes for the operational asset, criteria for controlling operating parameters of an operational asset (e.g., sensor data values which should trigger changes to an operating parameters of an operational asset), and alarm values associated with an operational asset. In addition, an asset template 428 can identify various data reporting criteria for a backend network 107. For example, an asset template 428 can identify criteria including, but not limited to, a data format for data being transmitted to the backend network, a reporting interval for reporting data, and pre-processing analyses to be performed on the data before transmission to the backend network.

In some examples, the tunneling module 430 is a component of the control system 406 that allows a backend network 107 to directly access an operational asset 320 through a network edge device 214. For example, the tunneling module 430 can facilitate the direct connect tunneling (DCT) communication mode of the network edge device 214 that is discussed in more detail below in reference to FIG. 5. For example, the tunneling module 430 provides a communication tunnel for the backend network 107 to directly poll the operational asset 320 for data or provide control signals directly to the operational asset 320 with no or minimal processing or reformatting of the data by the network edge device 214.

In some implementations, the tunneling module 430 can operate in the background (e.g., as a background processing thread). For example, the tunneling module 430 can enable the network edge device to operate in two communication modes concurrently. For example, the backend network may be permitted to directly poll or control the operational asset 320 through the tunneling module 430 (e.g., DCT communication mode) while the network edge device employs other components (e.g., polling & logging engine 434, local control module 436, location detection module 440) to concurrently provide additional or backup data gathering and control operations in another communication mode (e.g. store and forward (S&F) or autonomous communication modes (discussed below)).

In some examples, the data processing module 432 is a component of the control system 406 that can process data received form the operational asset 320. For example, the data processing module 432 can perform pre-processing of data by, for example, performing data analyses that the backend network 107 might normally perform. Thus, processing data at the network edge device 214 may reduce the processing burden on the backend network 107. For example, data analyses can include, but are not limited to, filtering the data, comparing the data to equipment alarm limits, performing frequency analysis (e.g., fast Fourier transform (FFT) analysis), trend analysis, power consumption analysis, motor current analysis (e.g., identifying magnitude and harmonic content), sensor noise analysis, sensor data linearization, temperature profiling, identifying equipment operational health signatures (e.g., failure analysis), plunger lift control optimization analysis, and chemical pump control. In some implementations, the data processing module 432 can perform data analyses to determine whether and how to control an operational asset 320 by, for example, adjusting operational parameters of the operational asset 320.

In some examples, the polling & logging engine 434 is a component of the control system 406 that provides autonomous data gathering, storage, and control operation logging functions for the network edge device 214. For example, the polling & logging engine 434 can perform the data gathering and control logging functions of the S&F and autonomous communication modes, described in more detail below.

In some examples, the local control module 436 is a component of the control system 406 that evaluates data received from the operational asset 320 and determines how to control the operational asset 320 based on the data. For example, the local control module 436 can determine whether and, if so, how to alter various operating parameters of the operational asset 320 based on the received data. For example, the local control module 436 may evaluate flow data from a flow meter associated with a pump. The local control module 436 can compare the flow data to operational rules associated with the pump and flow meter. For example, the operational rules may be defined in an asset template 428 for the pump and flow meter. The local control module 436 may determine that the flow is too low and that the pump should be started or that the pump's speed should be increased. In response, the local control module 436 can interface with the local control transaction engine 438 to start or increase the speed of the pump as appropriate.

In some implementations, the local control module 436 can interface with the low power network interface 444. The low power network interface 444 is a component of the control system 406 that provides communications with other devices (e.g., mobile computing devices and other network interface devices 214) over a low power network (e.g., a Bluetooth network, a local WiFi network, a ZigBee network, etc.). The low power network interface 444 communicates with a low power network RF module 446 (e.g., a Bluetooth low energy (BLE), WiFi, or ZigBee transceiver) to communicate over the low power network. In some examples, the local control module 436 can interface with the low power network interface 444 to obtain additional data for controlling the operational asset 320 from a different network edge device 214 that is connected to a different operational asset 320. For example, a first network edge device 214 may be connected to a pump for a chemical injection tank and may determine, based on flow data from a flow meter associated with the pump that the pump speed should be increased, however, after obtaining additional data from a second network edge device 214 connected to a level indicator that indicates the tank is nearly empty, local control module 436 of the first network edge device 214 can instead determine to shut down the pump.

In addition, the local control module 436 interfaces with the local control transaction engine 438. The local control transaction engine 438 is a component of the control system 406 that generates appropriate commands or control signals to control an operational asset 320 and manages any handshake and acknowledgement (ACK) protocols associated with the operational asset 320. More specifically, the local control transaction engine 438 receives control instructions for the operational asset 320 from the local control module 436 and provides the appropriate signaling to the operational asset 320 to cause the operational asset 320 to execute the instructions (e.g., change the appropriate operational parameters of the operational asset 320).

In some examples, operational rules associated with the particular operational asset or a type of operational asset to which the network edge device 214 is connected are included in the asset template. For example, operational rules can define, but are not limited to defining, equipment on/off set points, desired operating ranges (e.g., temperature, pressure, flowrate ranges, etc.), data analyses to be performed, identifying other network edge devices to communicate with for additional data, control signal command and acknowledgement rules and protocols for the operational asset, actions to take if "out of range" conditions occur, and levels of escalation (e.g., notifications, alerts, or alarms to send/activate).

In some examples, a location detection module 440 is a component of the control system 406 that detects the geographic location of the network edge device 214 and, by extension, the operational asset 320 to which the network edge device 214 is connected. For example, the location detection module 440 can be a GPS receiver, a cellular triangulation system, or a WiFi positioning system. In some implementations, the network edge device 214 can provide position data from the location detection module 440 when the network edge device 214 provides data updates to the backend network 107. In some examples, along with the location data, the network edge device 214 the network edge device 214 can provide identification data for either or both the network edge device 214 and the operational asset 320 associated with the network edge device 214, for example, so the backend network 107 can track the location of the operational asset 320 if the operational asset 320 is a mobile asset.

In some examples, a user interface (UI) engine 442 is a component of the control system 406 that can generate graphical user interfaces (GUIs) to present operational asset data on mobile computing devices. For example, the UI engine 442 can communicate with a corresponding application on a mobile computing device 102 through the low power network interface 444 to present GUI representations of the operational asset data received by the network edge device 214. In some examples, the UI engine 442 can generate GUI representations of traditional analog or digital gauges and meters. In some, examples, the UI engine 442 can generate GUI representations of graphs and charts that represent the results of various data analyses performed by the data processing module 432. Thus, the network edge device 214 may permit well-site workers to verify the operation of multiple well-site operational assets 320 from the comfort of a vehicle or on-site office.

In some implementations, the system architecture 400 can be implemented as various hardware components (e.g., processors and controllers). In some implementations, the system architecture 400 can be implemented in the firmware of a network edge device 214.

Figure 5:
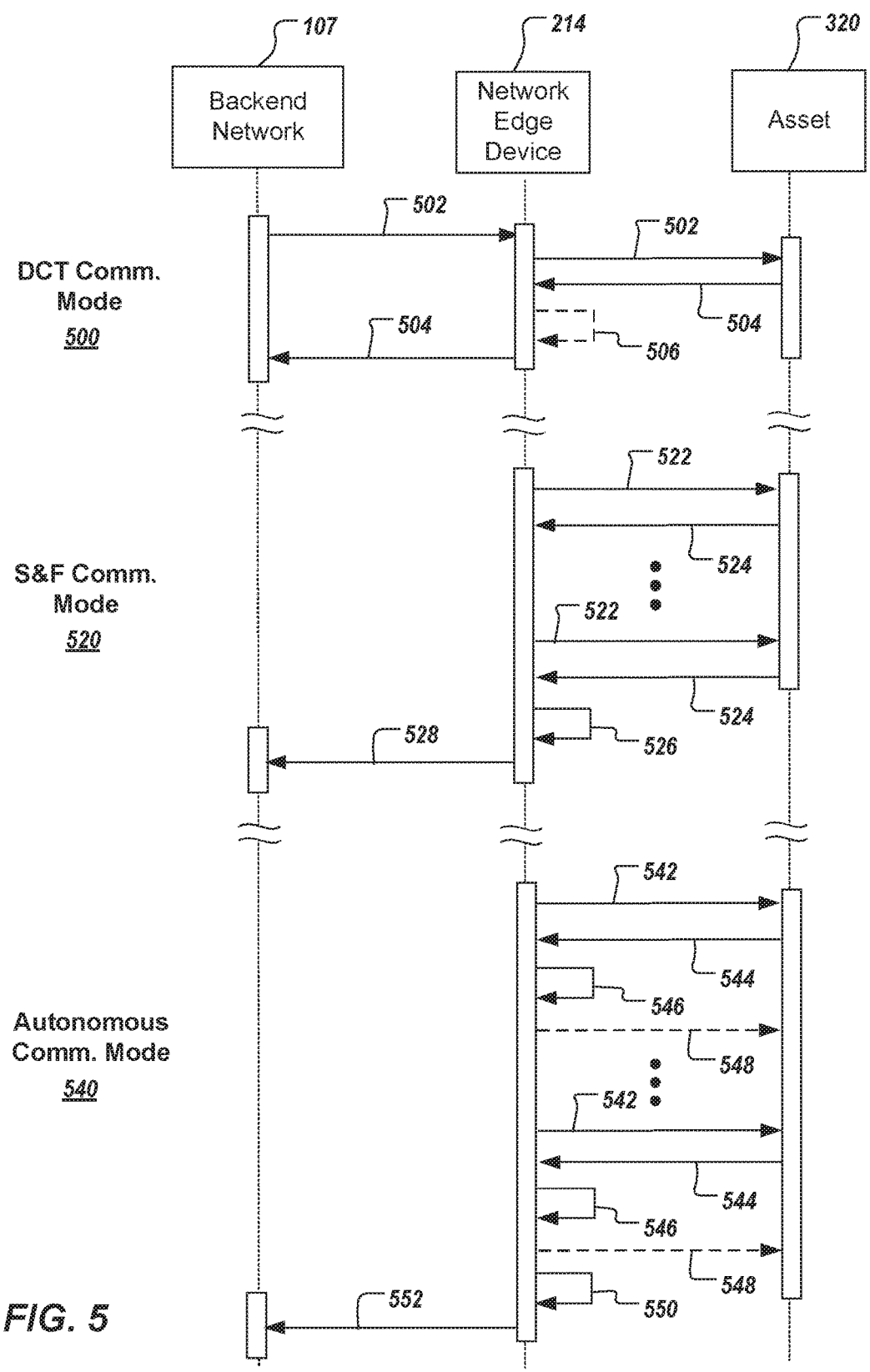
FIG. 5 depicts an example sequence diagrams in accordance with implementations of the present disclosure.

FIG. 5 depicts example sequence diagrams 500, 520, 540 of communication modes for a network edge device 214 in accordance with implementations of the present disclosure. The sequence diagrams depict example communications between a backend network 107, a network edge device 214, and an operational asset 320 in accordance with implementations of the present disclosure.

The sequence diagram 500 is a diagram of a direct connect tunneling (DCT) communication mode. In the depicted example, the network edge device 214 acts as a communication conduit for the backend network 107 to control operations of the operational asset 320. In the DCT communication mode, most or all data manipulation decisions and controls are directed by the backend network 107.

In some examples, the backend network 107 polls the operational asset 320 for data by issuing a data request 502. The network edge device 214 receives the request 502 and passes the request 502 on to the operational asset 320. In response to the request 502, the operational asset 320 sends the requested data 504 to the network edge device 214. In some examples, the network edge device may not send the request 502 to the operational asset 320 (e.g., in the case of an analog sensor), but instead, can sample the data output of the operational asset 320 in order to obtain the data 504. The network edge device 214 then sends the data 504 to the backend network 107.

In some examples, the network edge device 214 can, optionally, process 506 the data to reformat the data 504 from a data format provided by the operational asset 320 (e.g., raw voltage signals) into a data format used by the backend network 107 (e.g., a unified data format). The network edge device 214 then sends the reformatted data 504 to the backend network 107.

The DCT communication mode can be used in a similar manner for a backend network 107 to control the operations of an operational asset 320. For example, the backend network can issue a command or a control signal to the operational asset 320. The network edge device 214 receives the command or a control signal and passes the command or a control signal on to the operational asset 320. In response to the command or a control signal, the operational asset alters its operation in accordance with the command or control signal.

The sequence diagram 520 is a diagram of a store and forward (S&F) communication mode. In the depicted example, the network edge device 214 controls data gathering functions for the backend network 107. The network edge device 214 initiates communications with both the backend network 107 and the operational asset 320 on different time intervals. For example, the network edge device 214 polls the operational asset 320 for data on data sampling intervals (e.g., every minute), and transmits a series of data from the operational asset 320 to the backend network on data upload intervals (e.g., every hour). Generally, the data sampling interval is shorter than the data upload interval and the network edge device 214 stores the sampled data between data upload intervals. In the S&F communication mode, the network edge device 214 manages most or all of the data gathering process while the backend network 107 manages the control of the operational asset 320.

In some examples, the network edge device 214 polls the operational asset 320 for data by issuing a data request 522. In response to the request 522, the operational asset 320 sends the requested data 524 to the network edge device 214. In some examples, the network edge device may not send the request 502 to the operational asset 320 (e.g., in the case of an analog sensor), but instead, can sample the data output of the operational asset 320 in order to obtain the data 524. The network edge device 214 then stores the data 524 from the operational asset 320. In some examples, the network edge device 214 stores the data 524 in same format that the data was received from the operational asset 320. For example, the data 524 may be in a raw data format such as sensor voltage values. In some examples, the network edge device 214 can reformat the data 524 into a format specific to the backend network 107 and store the data in the backend network data format.

In some examples, the process described above, of polling the operational asset 320 to obtain data 524 and storing the data 524 is repeated at different times. For example, the network edge device 214 can poll the operational asset 320 on a regular sampling interval to obtain a series of data 524 over time. In some examples, a sampling interval may be specific to a particular operational asset 320. In some examples, the sampling interval for an operational asset 320 can be based on an expected rate of change of the data measured by the operational asset 320. For example, a sampling interval for a tank level sensor in which the fluid level is expected to change appreciably at a slow rate (e.g., hourly) can be longer than a sampling interval for an well-head pressure sensor that monitors a pressure that may change more rapidly (e.g., in minutes or seconds). In some examples, a sampling interval for a particular operational asset 320 or type of operational asset is defined in the asset template.

In some examples, the network edge device 214 enters a low power mode (e.g., a sleep mode) between data sampling intervals. For example, a low power mode can be an operational mode of the network edge device 214 in which nonessential components may be powered down. In some examples, the network edge device 214 may power down all components except an interval timer or interrupt circuit to trigger the network edge device 214 to transition out of the low power mode at an appropriate time. In some examples, the backend network 107 transmits data or commands to the network edge device 214 when the network edge device 214 is not in a low power mode, for example, during an upload interval.

In some examples, after several sampling intervals, the network edge device 214 processes 526 the stored data 524 from a data format provided by the operational asset 320 (e.g., raw voltage signals) into a data format used by the backend network 107 (e.g., a unified data format). The network edge device 214 then sends the reformatted data 528 to the backend network 107. In some examples, the network edge device 214 uploads stored data 528 to the backend network 107 on regular upload intervals. For example, the backend network 107 or the asset template may define an upload interval. The upload interval can be a defined period of time or can be based on accumulating a defined amount of data.

In some examples, the network edge device 214 can pre-process the data for the backend network 107 by, for example, performing data analyses locally before sending the data to the backend network 107. For example, data analyses can include, but are not limited to, filtering the data, comparing the data to equipment alarm limits, performing frequency analysis (e.g., FFT analysis), trend analysis, power consumption analysis, motor current analysis (e.g., identifying magnitude and harmonic content), sensor noise analysis, sensor data linearization, temperature profiling, identifying equipment operational health signatures (e.g., failure analysis), plunger lift control optimization analysis, and chemical pump control. In some examples, the network edge device 214 can upload data to the backend network 107 outside of (e.g., prior to) an upload interval, for example, based on the results of a data analysis. For example, if the network edge device 214 determines that the data 524 violates an alarm limit, the network edge device 214 can upload the data and a notification that data violates the alarm limit in real-time (e.g., soon after the alarming condition is determined).

The sequence diagram 540 is a diagram of an autonomous communication mode. In the depicted example, the network edge device 214 controls data gathering functions for the backend network 107 and provides a level of local autonomous control of an operational asset 320. As in the S&F mode, the network edge device 214 initiates communications with both the backend network 107 and the operational asset 320 on different time intervals. In addition, in the autonomous mode, the network edge device 214 can analyze the received data and determine whether to change operating parameters (e.g., turn equipment on/off, change pump speed, change valve position, etc.) of an operational asset 320.

In some examples, the network edge device 214 polls the operational asset 320 for data by issuing a data request 542. In response to the request 522, the operational asset 320 sends the requested data 544 to the network edge device 214. In some examples, the network edge device may not send the request 502 to the operational asset 320 (e.g., in the case of an analog sensor), but instead, can sample the data output of the operational asset 320 in order to obtain the data 544. The network edge device 214 then processes 546 the data 544 to determine whether to change an operating parameter(s) of the operational asset 320. For example, the network edge device 214 can compare the received data 544 to operating requirements (e.g., operating flow rates, pressure ranges, temperature ranges, etc.) to determine whether and, if so, how to alter the operating parameter(s) of the operational asset 320.

In some examples, the network edge device can process 546 the data 544 in conjunction with stored data to determine whether and, if so, how to change an operating parameter(s) of the operational asset 320. For example, the network edge device 214 can process 546 the data 544 by performing data analyses to determine whether and how to change an operating parameter(s) of the operational asset 320. For example, data analyses can include, but are not limited to, filtering the data, comparing the data to equipment alarm limits, performing frequency analysis (e.g., FFT analysis), trend analysis, power consumption analysis, motor current analysis (e.g., identifying magnitude and harmonic content), sensor noise analysis, sensor data linearization, temperature profiling, identifying equipment operational health signatures (e.g., failure analysis), plunger lift control optimization analysis, and chemical pump control.

In some implementations, the network edge device 214 can communicate with other network edge devices (e.g., at the same well-site) through a low power network (e.g., a BLE network) to obtain data from other operational assets 320 (e.g., sensor) and use the data from the other operational assets 320 to determine whether and how to change an operating parameter(s) of the operational asset 320. For example, a first network edge device 214 connected to a pump for a chemical injection tank may determine based on flow data from a sensor associated with the pump that the pump speed should be increased, however, after obtaining additional data from a second network edge device 214 connected to a level indicator that indicates the tank is nearly empty, the first network edge device 214 can instead shut down the pump and report the condition to the backend network 107.

In some examples, operational rules associated with the particular operational asset 320 or a type of operational asset to which the network edge device 214 is connected are included in the asset template. For example, operational rules can define, but are not limited to defining, equipment on/off set points, desired operating ranges (e.g., temperature, pressure, flowrate ranges, etc.), data analyses to be performed, identifying other network edge devices to communicate with for additional data, actions to take if "out of range" conditions occur, and levels of escalation (e.g., notifications, alerts, or alarms to send/activate).

Once the network edge device 214 has determined whether and, if so, how to adjust an operating parameter of the operational asset 320, the network edge device 214 can generate and send a command or control signal 548 to the operational asset 320 to control the operational asset 320.

The network edge device 214 can store the data 544 from the operational asset 320 and log any operational parameter changes. In some examples, the network edge device 214 stores the data 544 in same format that the data was received from the operational asset 320. For example, the data 544 may be in a raw data format such as sensor voltage values. In some examples, the network edge device 214 can reformat the data 544 into a format specific to the backend network 107 and store the data in the backend network data format.

In some examples, the process described above, of polling the operational asset 320 to obtain data 544, processing 546 the data 544, controlling the operational asset 320 by sending commands or control signals 548, and storing the data 544 is repeated at different times. For example, the network edge device 214 can poll the operational asset 320 for data and make control adjustments on a regular sampling interval. In some examples, a sampling and control interval may be specific to a particular operational asset 320. In some examples, the sampling and control interval for an operational asset 320, can be based on an expected rate of change of the data measured by the operational asset 320. For example, a sampling and control interval for a tank level sensor in which the fluid level is expected to change appreciably at a slow rate (e.g., hourly) can be longer than a sampling and control interval for an well-head pressure sensor that monitors a pressure that may change more rapidly (e.g., in minutes or seconds). In some examples, a sampling and control interval for a particular operational asset 320 or type of operational asset is defined in the asset template.

In some examples, the network edge device 214 enters a low power mode (e.g., a sleep mode) between data sampling and control intervals. For example, a low power mode can be an operational mode of the network edge device 214 in which nonessential components may be powered down. In some examples, the network edge device 214 may power down all components except an interval timer or interrupt circuit to trigger the network edge device to transition out of the low power mode. In some examples, the backend network 107 must transmit data or commands to the network edge device 214 when the network edge device 214 is not in a low power mode, for example, during an upload interval.

In some examples, after several sampling and control intervals, the network edge device 214 processes 550 the stored data 544 from a data format provided by the operational asset 320 (e.g., raw voltage signals) and converts the data along with any logged control functions into a data format used by the backend network 107 (e.g., a unified data format). The network edge device 214 then sends the reformatted operational asset data and control log data 552 to the backend network 107. In some examples, the network edge device 214 uploads stored operational asset data and control log data to the backend network 107 on regular upload intervals. For example, the backend network 107 or the asset template may define an upload interval. The upload interval can be a defined period of time or can be based on accumulating a defined amount of data.

As in the S&F mode, in some examples, the network edge device 214 can upload data to the backend network 107 outside of (e.g., prior to) an upload interval, for example, based on the results of a data analysis. For example, if the network edge device 214 determines that the data 524 violates an alarm limit, the network edge device 214 can upload the data and a notification that data violates the alarm limit in real-time (e.g., soon after the alarming condition is determined).

In some examples, the network edge device 214 is remains in communication with the backend network 107 to upload data and control status for the operational asset 320. For example, the network edge device 214 can remain receptive to interrogations and commands from the backend network 107. In some examples, the connection with the backend network 107 is run as a separate processing thread (e.g., background thread) so as not to disturb the local real-time control operations. In some examples, running the connection in a separate thread allows the network edge device 107 to shift unnecessary components (e.g., processors) into a low power mode when local data gathering and control functions are complete for a given time interval. For example, only the communication interface with the backend network 107 and a wakeup timer may remain operational during a low power mode.

In some implementations, the backend network 107 can instruct a network edge device 214 to shift between any of the three communication modes discussed above. In some implementations, a network edge device 214 can automatically shift out of the DCT communication mode and into either the S&F communication mode or the autonomous communication mode upon detection a mode shift condition. An example mode shift condition may be degradation in or loss off communications with the backend network. For example, if the quality of communications with the backend network 107 drops below a threshold level, a network edge device 214 can automatically shift out of the DCT mode and into either the S&F or autonomous mode, for example, to prevent loss of data from and/or interruption in control of an operational asset 320. Likewise, in some implementations, a network edge device 214 can shift from an S&F communication mode to an autonomous mode in response to a mode shift condition. For example, upon detecting a reduced quality of communications with the backend network 107, a network edge device 214 can automatically shift from an S&F mode to an autonomous mode, for example, to prevent the interruption in control of an operational asset 320. As another example, a network edge device 214 may operate in the DCT communication mode as "principle" mode or thread, while concurrently monitoring operational asset data for indications uncharacteristic data or operation (e.g., indications of asset failure or damage) as a separate, "background" mode or thread. The network edge device 214 can shift to an S&F mode of operation upon detecting uncharacteristic data or asset operation, for example, to ensure that sufficient data is retained to perform a failure analysis on the operational asset 320.

FIG. 6 depicts an example process 600 for facilitating data communications between an operational asset and a backend network that can be executed in accordance with implementations of the present disclosure. In some examples, the example process 600 can be provided as one or more computer-executable programs executed using one or more computing devices. In some examples, the process 600 is executed to communicate data from an operational asset to a backend network where the backend network is agnostic to communication protocols of the operational asset.

First data is received from an operational asset; the first data is formatted according to a first data format that is specific to the operational asset (602). For example, the first data can be received from an asset communication interface of a network edge device. The asset communication interface can be configured to interface with the operational asset according to communication protocols of the operational asset. In some examples, the first data format can be analog voltage or current signals. In some examples, the first data format can be a digital data format specific to the operational asset.

The first data is processed according to an asset template to generate second data that includes the first data and is formatted according to a second data format that is specific to a backend network (604). For example, the asset template can identify the first data format that is specificity to the operational asset and the second data format for data to be sent to the backend network. The asset template can be used by a network edge device to translate the data from the first data format to the second data format, thereby, allowing the backend network to receive data from the operational asset while being agnostic to the communication protocols of the operational asset.

The second data is transmitted to the backend network in the second data format that is specific to the backend network (606). For example, the network edge device can cause a backend network communication interface to transmit the second data to the backend network. The backend network communication interface can be configured to interface with the backend network according to communication protocols of the backend network.

FIG. 7 depicts an example process 700 for facilitating data communications between an operational asset and a backend network that can be executed in accordance with implementations of the present disclosure. In some examples, the example process 700 can be provided as one or more computer-executable programs executed using one or more computing devices. In some examples, the process 700 is executed to control an operational asset by a backend network where the backend network is agnostic to communication protocols of the operational asset.

Instructions are received from a backend network to change an operating parameter of an operational asset (702). For example, the first data can be received from an asset communication interface of a network edge device. The backend network communication interface can be configured to interface with the backend network according to communication protocols of the backend network.

A control signal to change the operating parameter of the operational asset is generated in accordance with the instructions and based on an asset template (704). For example, the asset template can identify control signal formats or protocols for an operational asset (e.g., analog or digital signals for controlling the asset). The asset template can be used by a network edge device to generate appropriate control signals to change operating parameter(s) of the operational asset in accordance with the instructions from the backend network. Thus, the backend network can control the operational asset while remaining agnostic to the control protocol of the operational asset.

The control signal is transmitted to the operational asset (706). For example, the network edge device can cause an asset communication interface to transmit the control signal to the operational device. The asset communication interface can be configured to interface with the operational asset according to communication protocols of the operational asset.

Figure 8:
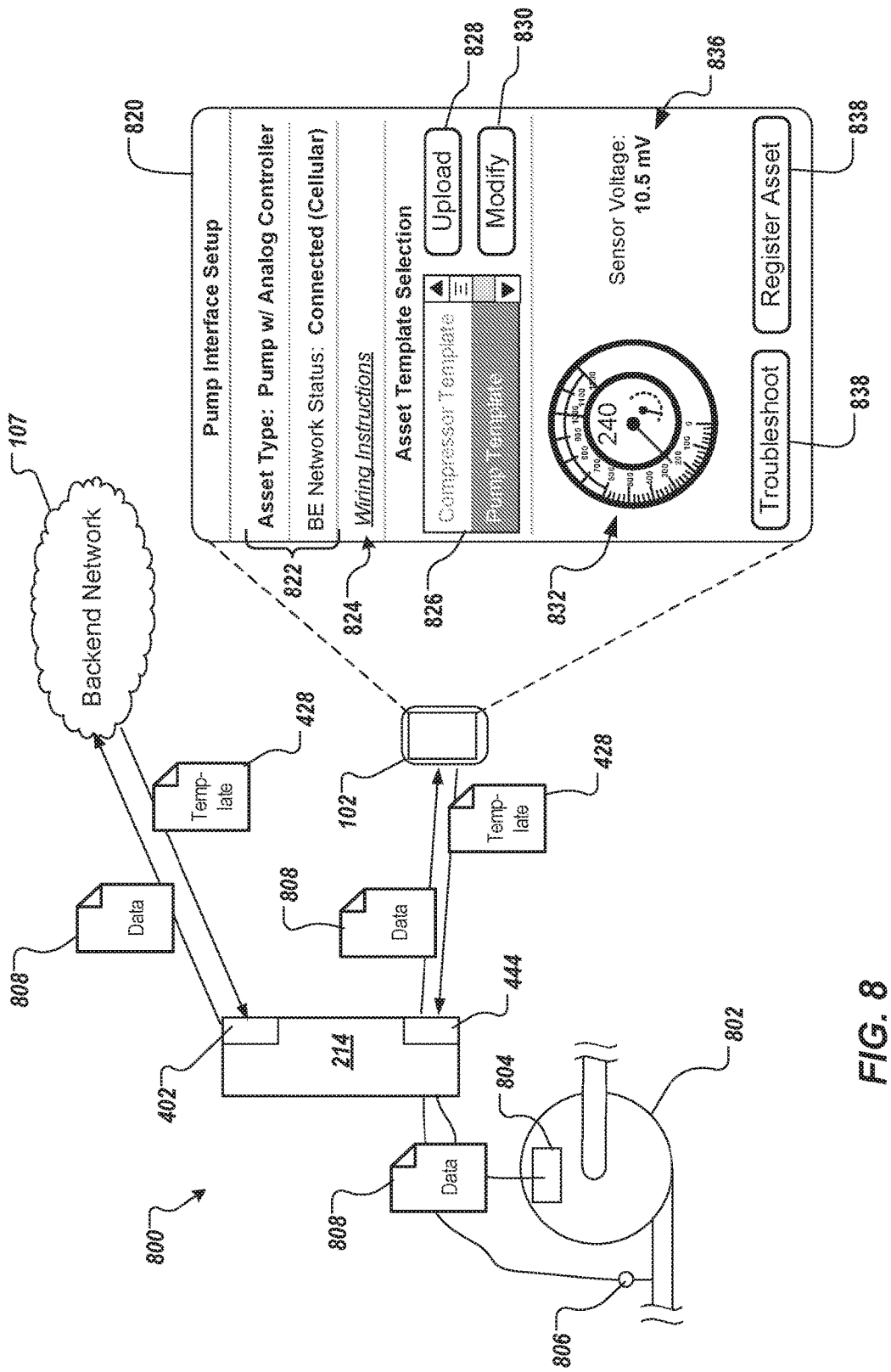
FIG. 8 depicts an example process flow for configuring a network edge device in accordance with implementations of the present disclosure.

FIG. 8 depicts an example process flow 800 for installing and configuring a network edge device 214 in accordance with implementations of the present disclosure. The following process is describe in reference to the example context of installing and configuring a network edge device 214 to interface with a pump 802 and an associated pressure sensor 806. However, a similar process may be used to install and configure a network edge device to interface with a variety of different operational assets.

FIG. 8 shows a network edge device 214 connected to a controller 804 for a pump 802 and a pressure sensor 806 associated with the pump 802. As described above in reference to FIG. 4, the network edge device 214 includes a backend network interface 402 and a low power network interface 444. The network edge device 214 is powered on and establishes communications with a backend network 107 and a user computing device 102.

For example, the network edge device 214 can establish communications with the backend network 107 through the backend network communication interface 402. In some examples, the network edge device 107 can be configured to communicate with the backend network 107 through one or more of a cellular communication channel, a satellite communication channel, or a RPMA communication channel. In some examples, the network edge device 107 is pre-configured with an appropriate RF module for a particular type of communication channel. In some examples, the network edge device 214 includes multiple RF modules and the network edge device 214 can select an appropriate communication channel. For example, well-sites can often be located in remote areas, and the best available communication channel (e.g., cellular, satellite, or RPMA) may not be known prior to a user (e.g., a service technician) arriving on site to install the network edge device 214. Thus, a network edge device 214 can be configured to select between multiple communication channels when it attempts to connect to the backend network 107. In some examples, the network edge device 214 selects a communication channel based on signal strength, data rate, or a combination of the two.

In addition, the network edge device 214 can establish communications with the user computing device 102 through a low power network interface 444 (e.g., a BLE interface). In some examples, the user computing device 102 can interface with the network edge device 214 through an application (e.g., an "app") executed by the user computing device 102. For example, the user computing device 102 can include a network interface device setup application ("setup app"). The setup app can permit a user to monitor the operation of the network edge device 214 and the operational asset (e.g., the pump 802 and sensor 806). In addition, the network edge device 214 can be configured for operation with the pump 802 and sensor 806 through the setup app.

The network edge device 214 may be connected to the pump controller 804 and pressure sensor 806 either before or after the network edge device 214 is powered on an establishes communications with the backend network and/or the user computing device 102. In some implementations, the setup app allows a user to access installation instructions that can include wiring diagrams for connecting the pump controller 804 and sensor 806 to the network edge device 214.

The network edge device 214 receives an asset template 428 from either the backend network 107 or the user computing device 102. The asset template 428 can be specific to a particular model of the pump 802 and sensor 806 or the asset template 428 can be more generic, for example, an asset template 428 for a general pump and pressure sensor. For example, an asset template 428 that is specific to a particular model of an operational asset may require less manual configuration from a user than an asset template 428 that is specific to a general type of operational asset (e.g., a pump, compressor, temperature sensor, or pressure sensor).

In some examples, a user can download an asset template 428 to the user computing device 102 (e.g., before traveling to a well-site) and upload the asset template 428 to the network edge device 214 from the user computing device 102. In some examples, a user can select an appropriate asset template 428 through the user computing device 102 (e.g., through a menu on the setup app). The user computing device 102 can send data identifying the appropriate asset template 428 to the network edge device 214, and the network edge device 214 can request the appropriate asset template 428 from the backend network 107. In some implementations, the network edge device 214 can automatically determine the type and/or model of an operational asset, and request an appropriate asset template 428 from the backend network 107 itself. For example, if the pump 802 is a computer controlled pump controller 804 (e.g., an "intelligent-controller") the network edge device 214 can request identification data from the pump controller 804 and send the identification data to the backend network 107 with the request for the asset template 428. In some implementations, a network edge device 214 can identify a the type of operational asset 320 that is connected to the network edge device 214 by performing a command/response analysis. For example, the network edge device 214 can send predefined commands, control signals, or interrogations to an operational asset 320 and identify the type of the operational asset by the response(s) received from the commands. In some examples, the network edge device 214 can use multi-parsing techniques to narrow down unique asset responses.

As described above, the asset template 428 can facilitate communication between the backend network 107 and the pump controller 804 and/or sensor 806 while permitting the backend network to be agnostic to the communication protocols of the pump controller 804 and/or sensor 806 and permitting the pump controller 804 and/or sensor 806 to be agnostic to communication protocols of the backend network 107.

In some implementations, the network edge device 214 receives user input from the user computing device 102 to modify the asset template 428. For example, a user may need to modify an asset template 428 to adapt the asset template 428 to the desired operation of a particular operational asset. For example, it may be necessary to modify a general asset template for a pump 802 for operation with a particular model pump 802. Similarly, it may be necessary to modify an asset template 428 to include operating ranges of a pump 802 based on operating requirements at a particular well-site. In some examples, it may be necessary to modify an asset template 428 to set a communication mode for the network edge device 214 or to schedule data reporting intervals and data sampling intervals based on well-site or customer requirements. Upon receiving such modifications from the user computing device 102, the network edge device 214 can make appropriate modifications to the asset template 428. In some implementations, the user computing device 102 (e.g., the setup app) or the backend network 107 make the modifications to the asset template 428 before sending the asset template 428 to the network edge device 214.

In some implementations, a user can verify the operation of the network edge device 214 by, for example, streaming data 808 from the pump controller 804 and/or sensor 806 to the user computing device 102 through the network edge device 214. The network edge device 214 can simulate transmitting the data 808 to the backend network 107 by, for example, formatting the data in a data format specific to the backend network 107 based on the asset template 428 before sending the data to the user computing device 102. In some examples, the setup app on the user computing device 102 can emulate the backend network 107, for example, to verify proper data formatting.

In some examples, the network edge device 214 can send data for displaying measurement data 808 from the pump controller 804 or the sensor 806 as a graphical representation of an analog gauge or digital meter display. For example, the network edge device 214 can identify a gauge or meter type that is appropriate to the pressure sensor 806 such as an analog pressure gauge. In some examples, the network edge device 214 determines an appropriate gage or meter type based on data contained in the asset template 428.

In some implementations, the network edge device 214 can assist with troubleshooting unexpected data 808 readouts from the operational asset. For example, the network edge device 214 can enter a troubleshooting mode. In the troubleshooting mode, a network edge device 214 can vary the formatting of sensor measurement data 808 that is sent to the user computing device 102. For example, a network edge device 214 can send data 808 to the user computing device 102 at various levels of abstraction to aid a user in determining the source of a potential problem and making appropriate modifications to the network edge device 214, the connection between the network edge device and the operational asset (e.g., sensor 806), or the asset template 428.

For example, the network edge device 214 can provide the data 808 to the user computing device 102 in various different formats that allows a user to step through the data processing performed by the network edge device 214. For example, if data displayed on the user computing device 102 is in an improper format or is inaccurate, the network edge device 214 can allow a user to view data in a different format. For example, the network edge device 214 can send the data 808 to the user computing device in the same format that the data 808 is received from the operational asset (e.g., raw or unformatted data). The data 808 can then be displayed as either digital data packets (e.g., if the operational asset is a computer controlled device) or as analog voltage or current values. As a non-limiting example, levels of data abstraction for a pressure transducer can include voltage levels (e.g., 1-5V), pressure values corresponding to the voltage levels (e.g., 1-5V=0-100 psi), and tank/container volume (e.g., volume in gallons derived from the size/shape of a tank and the hydrostatic pressure). As another non-limiting example, levels of data abstraction for a digital data can include little endian vs big endian byte order, fixed vs float formats, etc. The abstraction levels can be varied iteratively to compare with observable, real world values.

The network edge device 214 registers with the backend network 107 to go "online" with the backend network 107. For example, network edge device 214 can go "online" with the backend network 107 by beginning to send the data 808 from the pump controller 804 and the sensor 806 to the backend network 107 and by beginning to receive control instructions from the backend network 107 for controlling the pump 802 (or controlling the pump 802 autonomously from the network edge device 214, as described above). In some examples, the network edge device 214 receives a command from the user computing device 102 to register with the backend network 107. For example, after a user has verified proper operation of the network edge device 214 on the user computing device 102, the user may select an input on the setup app to cause the network edge device to register with the backend network 107. In some examples, registering with the backend network 107 can include sending registration data that identifies the network edge device 214 and/or the operational asset(s) (e.g., pump 802 and sensor 806) connected to the network edge device 214. Registration data can include, but is not limited to, a serial or model number of the network edge device 214, a type of the operational asset, a model number of the operational asset, a serial number of the operational asset, and registration credentials (e.g., a code or password), location data (e.g., GPS data), installation anomalies, maintenance tips, and accessibility information (e.g., gate codes, undocumented streets, trails).

A setup app can include a GUI such as example GUI 820. For example, the GUI 820 shows status indicators 822 that indicate the status of the network edge device 214 as connected to a pump with an analog controller and connected to the backend network 107 through a cellular communication channel. In addition, the GUI 820 includes a hyperlink 824 to wiring instructions for connecting the pump 802 to the network edge device 214.

In some examples, the GUI 820 can include an asset template selection menu 826. For example, a user can select an appropriate template to transfer to a network edge device 214 from a list of asset templates such as a compressor template or a pump template. In some examples, the GUI 820 can include a selectable control 828 for uploading a selected template to the network edge device 214. Although not shown, in some examples, the GUI 820 can include a selectable control for causing the network edge device 214 to download a selected asset template 428 from the backend network 107.

In some implementations, the GUI can include a selectable control 830 for modifying a selected asset template 428. For example, selection of the selectable control 830 can cause the setup app to display a template modification GUI (not shown). A template modification GUI can provide a user with appropriate menu selections and input controls for modifying various aspects of an asset template 428, as discussed above. In some examples, a setup app can include options for saving the modified asset template 428 to the backend network 107. For example, a modified asset template 428 can be added to an asset template library as a template specific to a particular operational asset or template specific to a customer or a well-site.

In some examples, as discussed above, the GUI 820 can display data from an operational asset (e.g., pressure sensor 806) as a graphical representation 832 of a traditional gauge or meter. For example, GUI 820 includes a graphical representation 832 of a pressure gauge. As noted above, the network edge device 214 can send data for displaying measurement data 808 from the pump controller 804 or the sensor 806 in a as graphical representation of a traditional gauge or meter. For example, the network edge device 214 can identify a gauge or meter type that is appropriate to the pressure sensor 806 such as an analog pressure gauge. The setup app can render the appropriate graphical representation 832 in the GUI 820.

In some examples, the GUI 820 includes a selectable control 838 for entering a troubleshooting mode. For example, as discussed above, a network edge device 214 can provide a troubleshooting mode that allows a user to view the data 808 from an operational asset at various levels of abstraction. For example, the GUI 820 shows voltage data 836 from pressure sensor 806. The troubleshooting mode may permit a user to properly calibrate the network edge device 214 to interpret data from an operational asset such as an analog pressure sensor 806, for example.

In some examples, the GUI 820 includes a selectable control 838 for registering the operational asset and/or network edge device 214 with the backend network 107 and bringing the operational asset and network edge device 214 "online" with the backend network 107. For example, upon selection of the selectable 838, the setup app may request a code or password from a user to register the network edge device 214 with the backend network 107.

Figure 9:
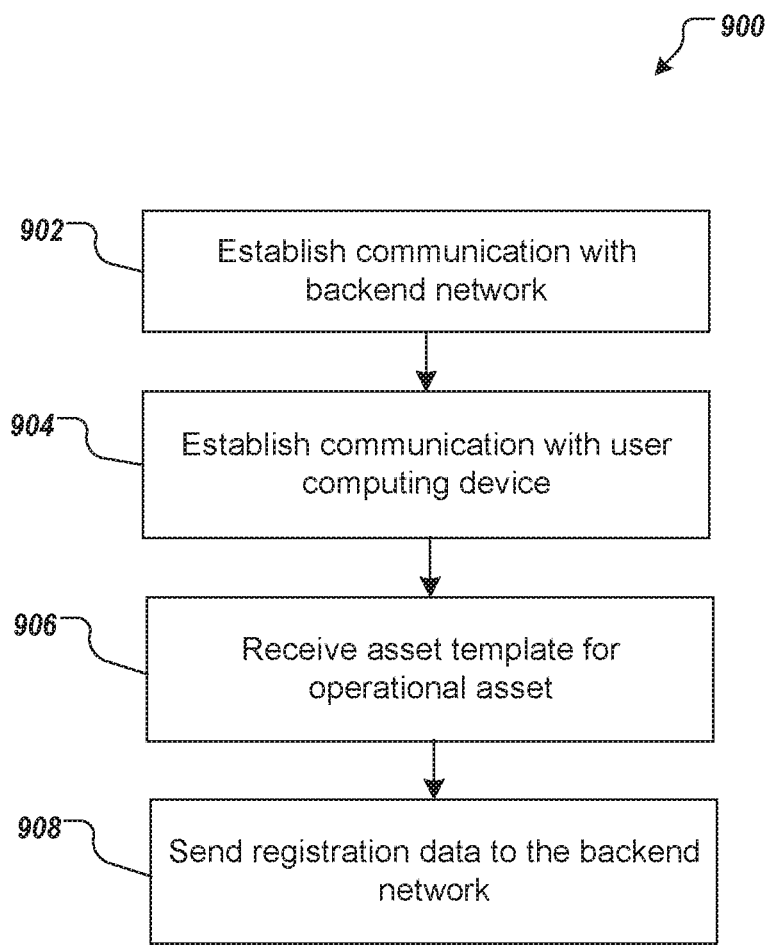
FIG. 9 depicts an example process for configuring a network edge device for communicating between an operational asset and a backend network that can be executed in accordance with implementations of the present disclosure.

FIG. 9 depicts an example process 900 for configuring a network edge device for communicating between an operational asset and a backend network that can be executed in accordance with implementations of the present disclosure. In some examples, the example process 900 can be provided as one or more computer-executable programs executed using one or more processors of a network edge device. In some examples, the process 900 is executed to setup a network edge device for facilitating communications between a backend network and an operational asset where the backend network and operational device are agnostic to communication protocols of each other.

A network edge device establishes communications with a backend network (902). The network edge device establishes communications with a user computing device. For example, the network edge device can establish communications with the backend network through a first network connection and establish communications with the user computing device through a second network connection. For example, the network edge device can communicate with the backend network over a cellular, satellite, or RPMA network connection, and communicate with the user computing device through a low power network connection (e.g., a BLE network, a local WiFi network, a ZigBee network).

The network edge device receives an asset template associated with an operational asset to which the network edge device is coupled (906). For example, an asset template can identify communication protocols of the backend network and communication protocols of the operational asset to which the network edge device is coupled. The network edge device can be configured to use the asset template to coordinate communications between the backend network and the operational asset while permitting the backend network and the operational asset to each be agnostic to communication protocols of the other. In some examples, the network edge device can use the asset template to coordinate control of the operational asset by the backend network.

The network edge device sends registration data to the backend network (908). For example, the network edge device can send the registration data to the backend network after receiving an instruction from the user computing device. For example, registration data can include, but is not limited to, a serial or model number of the network edge device 214, a type of the operational asset, a model number of the operational asset, a serial number of the operational asset, and registration credentials (e.g., a code or password), location data (e.g., GPS data), installation anomalies, maintenance tips, and accessibility information (e.g., gate codes, undocumented streets, trails). In some examples, the network edge device registers with the backend network to begin processing communications between the backend network and the operational asset; the network edge device goes "online" with the backend network. In some implementations, the registration of the network edge device and/or the operational asset with the backend network completes the configuration process for the network edge device.

Figure 10:
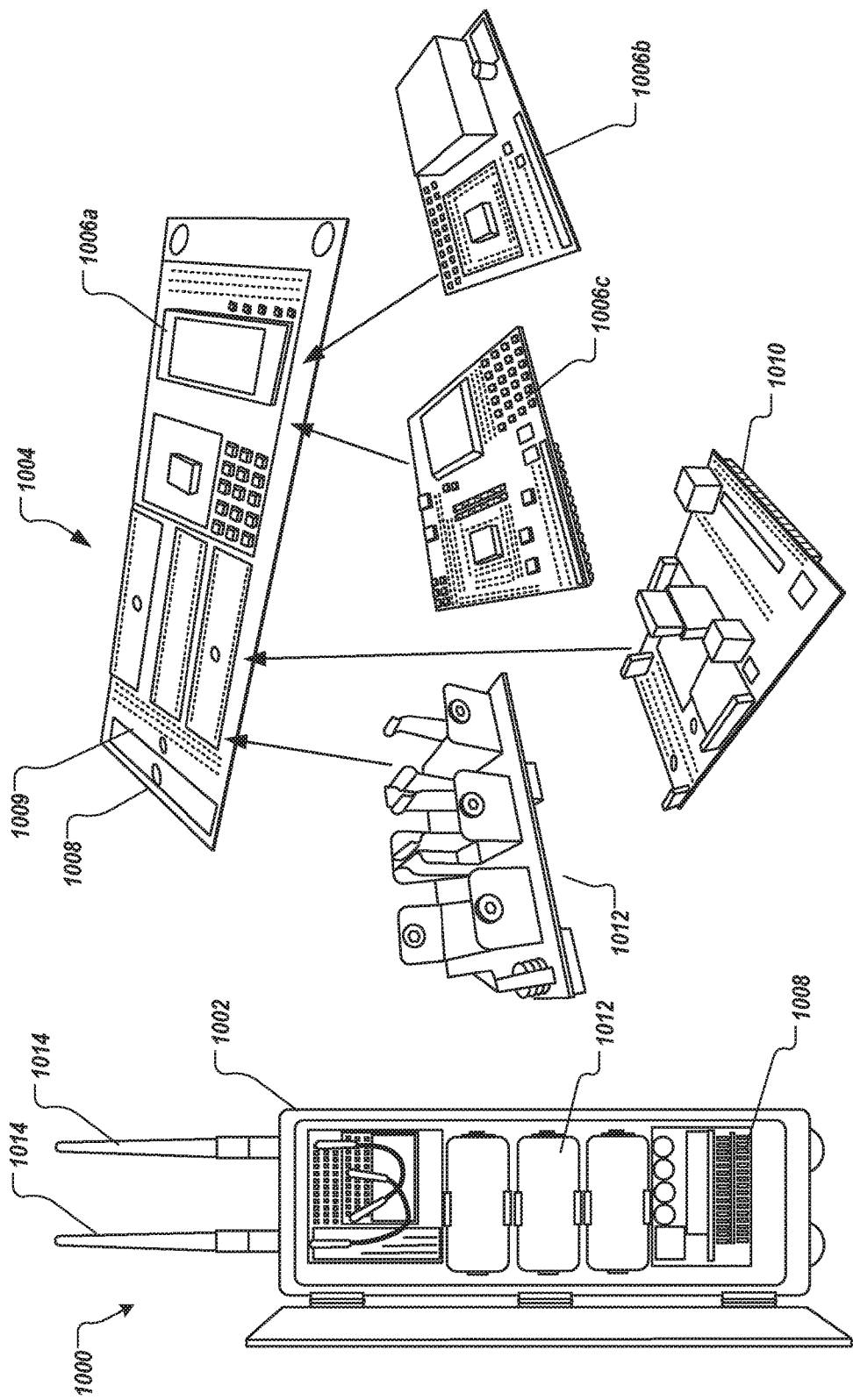
FIGS. 10A and 10B depict a first example embodiment of a network edge device in accordance with implementations of the present disclosure.

FIGS. 10A and 10B depict a first example embodiment of a network edge device 1000 in accordance with implementations of the present disclosure. FIG. 10B depicts an exploded view of the electronic components of the network edge device 1000. The network edge device 1000 includes a housing 1002 that contains an electronic control board 1004. The electronic control board 1004 includes one or more processors and computer-readable memory. The computer-readable memory includes instructions that cause the processors to perform the operations described herein. For example, the control board 1004 can include a combination of electronic hardware components and computer firmware to implement the system architecture described above in reference to FIG. 4.

Furthermore, the control board 1004 includes a modem connection port (not shown) for receiving an RF modem module (e.g., RF modules 412*a*-412*n* of FIG. 4). For example, a modem connection port can be a communication interface port configured to receive one or more of various different types of detachable RF modem modules. An RF modem module can be implemented as an RF modem board 1006*a*-1006*c* that can be connected to the modem connection port. The RF modem board 1006*a*-1006*c* includes one of a variety of types of RF modems configured to perform electronic communications. Various types of RF modem boards can include, but are not limited to, an RPMA modem board 1006*a*, a satellite communication modem board 1006*b*, and a cellular communication modem board 1006*c*. In addition, the network edge device 1000 includes detachable antenna(s) 1014 mounted to the housing that can be connected to an RF modem board 1006*a*-1006*c* installed in the network edge device 1000. The type of installed antenna(s) correspond to the type of RF modem installed in the network edge device 1000.

In some implementations, the control board 1004 can be configured to automatically identify the type of modem board 1006*a*-1006*c* connected to the modem connection port. Further, the control board 1004 (e.g., instructions stored on the control board 1004) can adapt the operations of the network edge device 1000 to the type of modem board 1006*a*-1006*c* connected to the modem connection port. For example, the operations of the network edge device 1000 can be adapted to communicate with an installed RF modem board 1006*a*-1006*c* according to a communication protocol that is specific to the type of RF modem on the board. Thus, the network edge device 1000 may be configured or reconfigured for operation with different communication networks by changing the RF modem board 1006*a*-1006*c* to an appropriate type.

The control board 1004 includes a wiring bay 1008 for connecting operational assets to the network edge device 1000. The wiring bay 1008 includes various different types of input and output (I/O) interfaces for connecting a variety of different analog, digital, and computer controlled operational assets. The wiring bay 1008 I/O interfaces include appropriate circuitry and software to receive and transmit appropriate signals. For example, the wiring bay 1008 I/O interfaces can include, but are not limited to, serial data communication interface(s) (e.g., RS232, RS485, USB, etc.), analog current signal input interface(s), analog current signal output interface(s), analog voltage signal input interface(s), pulse signal input interface(s), digital signal input interface(s), and temperature sensor input interface(s) (e.g., a thermistor interface, a resistance temperature detector (RTD) interface, or a thermocouple interface).

In some implementations, the control board 1004 includes an I/O expansion port 1009. The I/O expansion port 1009 is configured to receive a detachable I/O expansion board 1010. For example, the I/O expansion board 1010 can be added to a network interface device 1000 to accommodate the connection of additional operational assets to the network interface device 1000 if the wiring bay 1008 I/O interfaces are insufficient. In some implementations, the I/O expansion board 1010 includes a motor controller. For example, the I/O expansion board 1010 can be added to a network edge device 1000 for controlling a motor that does not have a separate motor controller or as a replacement (e.g., upgraded) motor controller. In some implementations, an I/O expansion board 1010 includes, but is not limited to including, the following I/O interfaces: a motor controller, serial data communication interface(s), analog current signal input interface(s), analog current signal output interface(s), analog voltage signal input interface(s), pulse signal input interface(s), digital signal input interface(s), and temperature sensor input interface(s).

In some implementations, the control board 1004 is configured to receive a detachable battery module 1012. For example, the battery module 1012 can be connected to the control board 1004 for providing battery power to the network edge device 1000. The battery module 1012 can serve as either a primary or a backup power source for the network edge device 1000.

Figure 11:
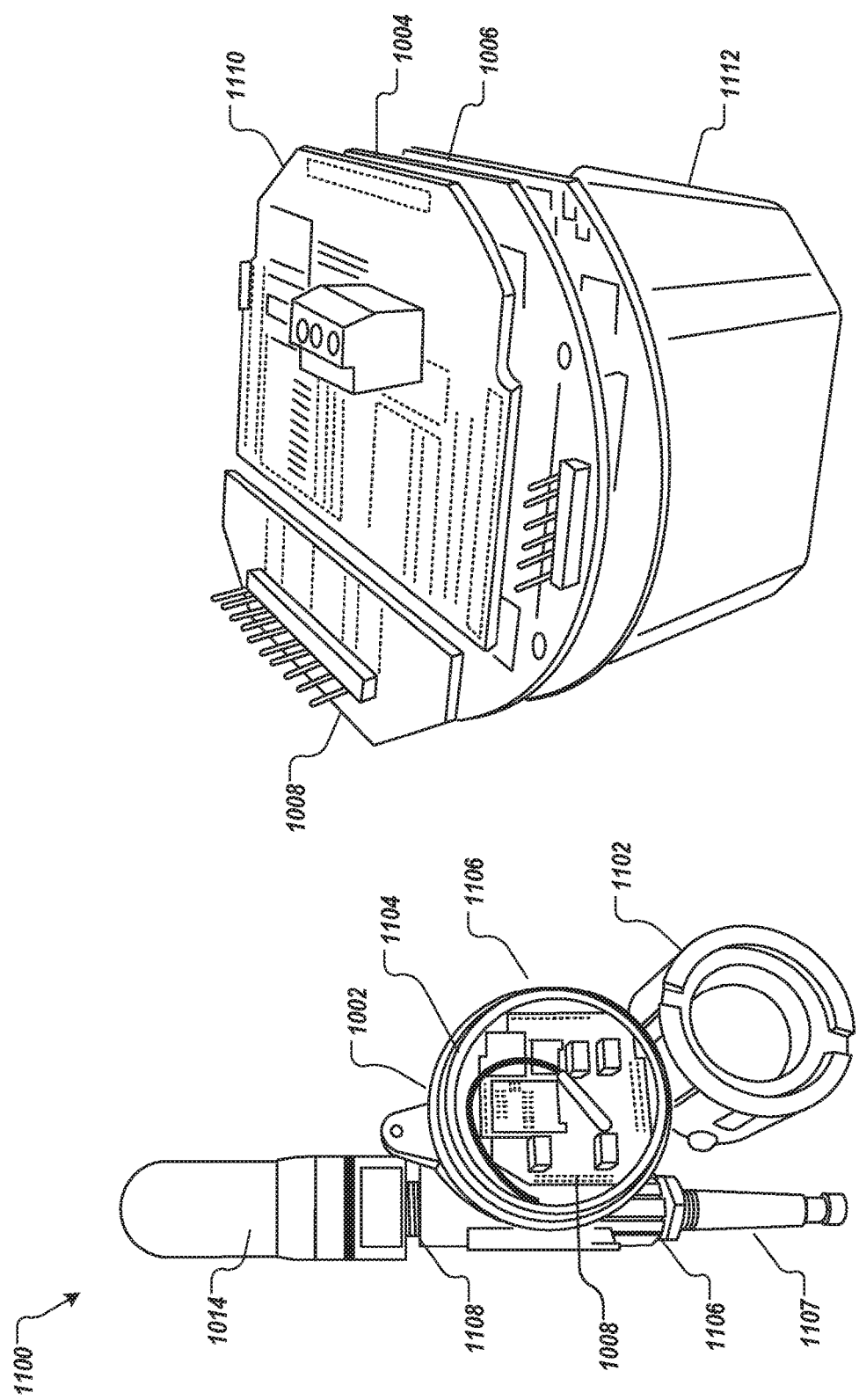
FIGS. 11A and 11B depict a second example embodiment of a network edge device in accordance with implementations of the present disclosure.

FIGS. 11A and 11B depict a second example embodiment of a network edge device 1100 in accordance with implementations of the present disclosure. FIG. 11B depicts an exploded view of the electronic components of the network edge device 1100. The network edge device 1100 shown in FIGS. 11A and 11B is similar to the network edge device 1000 shown in FIGS. 10A and 10B, however, the network edge device 1100 has a more compact design. The network edge device 1100 includes a housing 1002 that contains an electronic control board 1004. The electronic control board 1004 includes one or more processors and computer-readable memory. The computer-readable memory includes instructions that cause the processors to perform the operations described herein. For example, the control board 1004 can include a combination of electronic hardware components and computer firmware to implement the system architecture described above in reference to FIG. 4.

Furthermore, the control board 1004 includes a modem connection port (not shown) for receiving an RF modem module (e.g., RF modules 412*a*-412*n* of FIG. 4). For example, a modem connection port can be a communication interface port configured to receive one or more of various types of detachable RF modem modules (e.g., RF modem board 1006). Although only one RF modem board 1006 is shown, the RF modem board 1006 can be, but is not limited to, any of the types of RF modem boards discussed above. As discussed above, the control board 1004 can be configured to automatically identify the type of modem board 1006 connected to the modem connection port.

In illustrated implementation of the network edge device 1100, the wiring bay 1008 is included on an I/O board 1110 that is separate from, but connected to, the control board 1004. The wiring bay 1008 allows for connecting operational assets to the network edge device 1100. The wiring bay 1008 includes a various different types of input and output (I/O) interfaces for connecting a variety of different analog, digital, and computer controlled operational assets. The wiring bay 1008 I/O interfaces include appropriate circuitry and software to receive and transmit appropriate signals. For example, the wiring bay 1008 I/O interfaces can include, but are not limited to, serial data communication interface(s) (e.g., RS232, RS485, USB, etc.), analog current signal input interface(s), analog current signal output interface(s), analog voltage signal input interface(s), pulse signal input interface(s), digital signal input interface(s), and temperature sensor input interface(s) (e.g., a thermistor interface, a resistance temperature detector (RTD) interface, or a thermocouple interface).

The I/O board 1110, control board 1004, and RF modem board 1006 are arranged in stacked arrangement along with a battery compartment 1112 inside a more compact housing 1002. That is, the stacked arrangement of boards 1110, 1004, and 1006 may permit the circuitry of the network edge device 1100 to be housed in a more compact housing 1002 than the embodiment shown in FIGS. 10A and 10B. The battery compartment 1112 houses batteries for providing either primary or backup power to the network edge device 1100. In some examples, the housing 1002 includes a detachable cover 1102. The cover 1102 can include threading that interfaces with corresponding threading 1104 on the housing 1002 to attach the cover 1102 to the housing 1002.

In some implementations, the housing 1002 includes a threaded connection 1106 for mounting the network edge device 1100 directly to an operational asset 1107 (e.g., a sensor). In some implementations, the threaded connection point 1106 can be used to connect a conduit (e.g., a flexible or shielded conduit) containing wiring from an operational asset to the network edge device 1100.

In addition, the network edge device 1100 includes a detachable antenna 1014 mounted to the housing that can be connected to an installed RF modem board 1006. The type of installed antenna corresponds to the type of RF modem installed in the network edge device 1100. In some implementations, the antenna 1014 can be mounted to the housing 1002 by a threaded connection 1108.

In some implementations, the network edge device 1000 or 1100 is designed to meet or exceed a National Electric Code (NEC) classification for an explosion proof device in an explosive gas area. For example, the network edge device 1000 or 1100 can be designed to meet or exceed an NEC classification for use in an NEC Class I Division 1 (CID1) location or an NEC Class I Division 2 (CID2) location.

FIGS. 12-15 illustrate various wiring configurations for connecting operational assets to either the wiring bay 1008 or an I/O expansion board 1010 of a network edge device. The following figures and descriptions serve as non-limiting examples of the variety of input types and configurations that can be included in network edge devices according to implementations of this disclosure. In addition, the following figures and descriptions serve as non-limiting examples of the variety of operational assets that network edge devices can be configured to monitor and/or control according to implementations of this disclosure.

Figure 12:
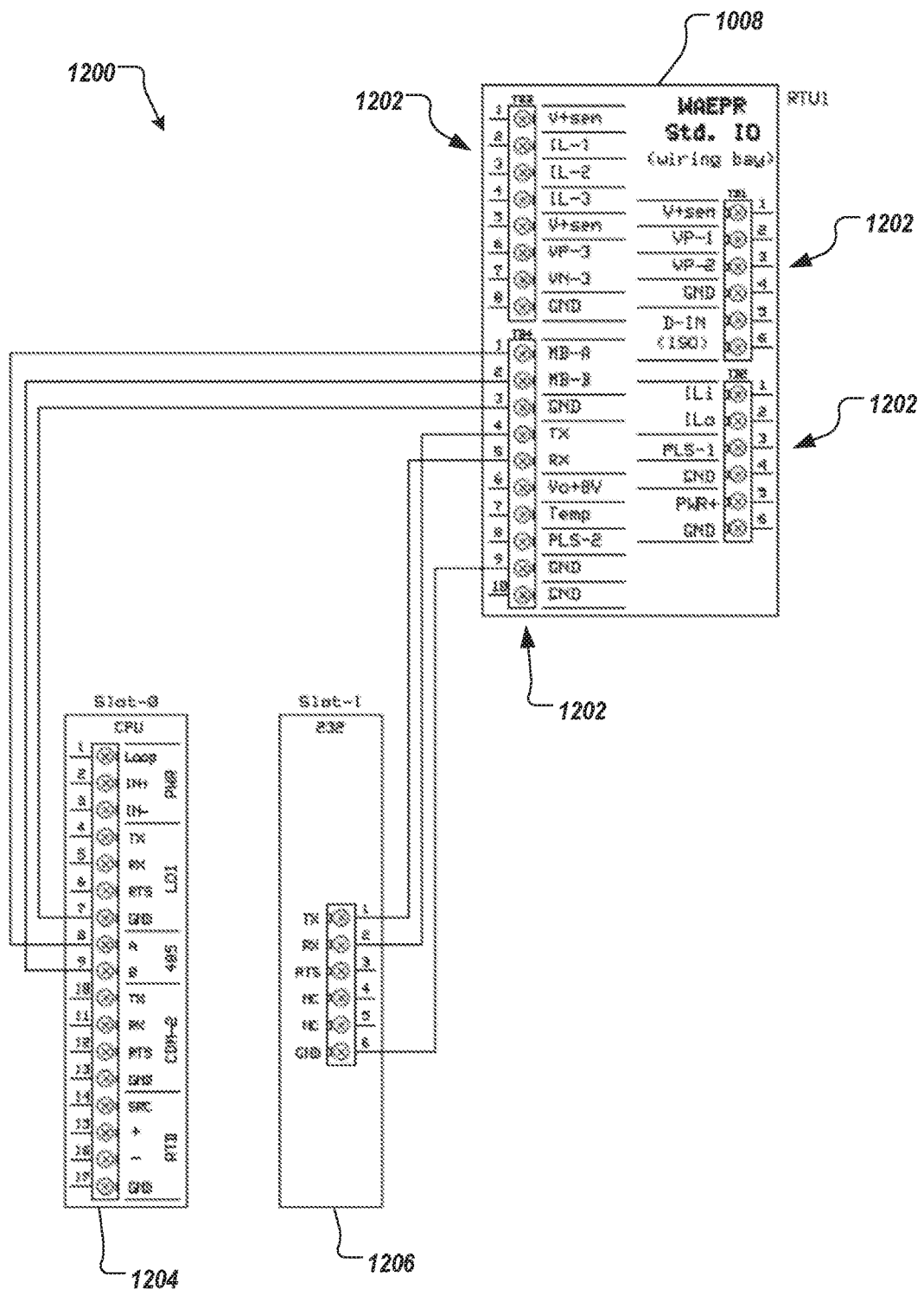
FIG. 12 depicts a diagram of an example wiring configuration for connecting an operational asset using serial data interfaces of a network edge device.

FIG. 12 depicts a diagram 1200 of an example wiring configuration for connecting an operational asset using serial data interfaces of a network edge device. The diagram 1200 shows a wiring bay 1008 of a network edge device with serial data wiring connections from an RS485 interface 1204 of an operational asset and an RS 232 interface 1206 of an operational asset. The wiring bay 1008 includes several rows of various different I/O interfaces 1202. The example I/O interfaces 1202 include (from top left to bottom right) a power supply output (V+sen), analog current signal inputs (IL-1, IL-2, IL-3), another power supply output (V+sen), positive and negative analog sensor differential voltage inputs (VP-3, VN-3), a ground or reference voltage connection (GND), an RS485 serial data interface (MB-A, MB-B, GND), an RS 232 serial data interface (TX, RX), an 8V signaling output (V.+8V), a thermistor input (Temp), a pulse counter input (PLS-2), additional ground or reference voltage connections (GND), another power supply output (V+sen), analog voltage signal inputs (VP-1, VP-2), an additional ground or reference voltage connection (GND), a digital signal input (D-IN), an analog control signal interface (ILi, ILo), another pulse counter input (PLS-1), an additional ground or reference voltage connection (GND), and an external power supply connection (PWR+, GND).

In the example wiring configuration for the RS485 serial connection, terminal A of the RS485 interface 1204 is connected to the MB-A terminal of the wiring bay 1008 I/O interface 1202. Terminal B of the RS485 interface 1204 is connected to the MB-B terminal of the wiring bay 1008 I/O interface 1202. And, the ground terminal (GND) of the RS485 interface 1204 is connected to a ground (GND) terminal of the wiring bay 1008 I/O interface 1202.

In the example wiring configuration for the RS232 serial connection, the transmitted data terminal (TX) of the RS232 interface 1204 is connected to the received data terminal (RX) of the wiring bay 1008 I/O interface 1202. The received data terminal (RX) of the RS232 interface 1204 is connected to the transmitted data terminal (TX) of the wiring bay 1008 I/O interface 1202. And, the ground terminal (GND) of the RS232 interface 1204 is connected to a ground (GND) terminal of the wiring bay 1008 I/O interface 1202.

Figure 13:
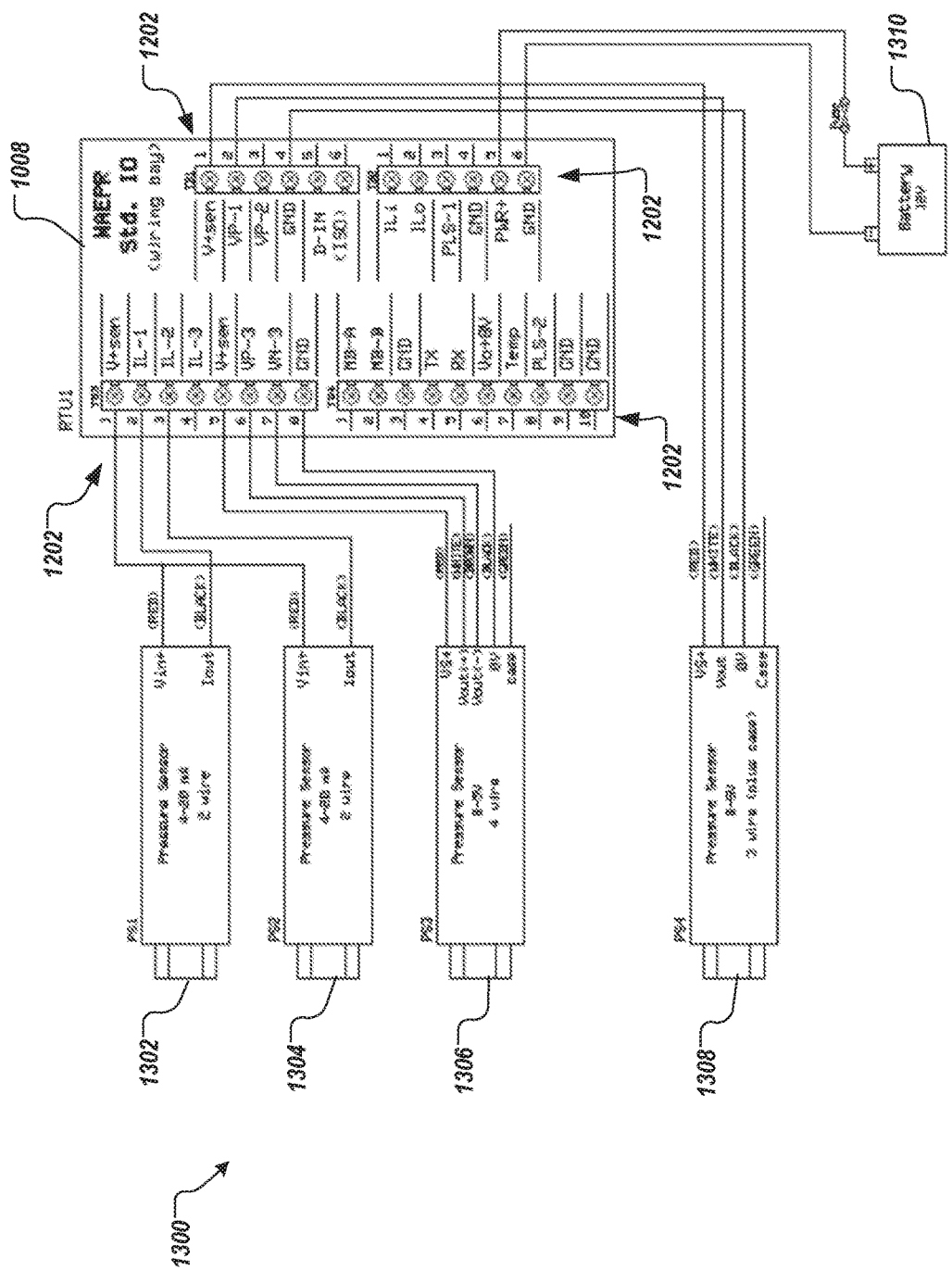
FIG. 13 depicts a diagram of an example wiring configuration for connecting an operational asset using analog data interfaces of a network edge device.

FIG. 13 depicts a diagram 1300 of an example wiring configuration for connecting an operational asset using analog data interfaces of a network edge device. The diagram 1300 illustrates several wiring configurations for connecting different sensors to the wiring bay 1008 of a network edge device.

For example, two 2-wire sensors 1302 and 1304 (e.g., 2-wire pressure sensors) are shown as being connected to the analog current signal inputs (IL-1, IL-2) of the wiring bay 1008. The power supply terminals (Vin+) of both 2-wire sensors 1302, 1304 are connected to a power supply output (V+sen) of the wiring bay 1008 to provide power to the sensors 1302, 1304. The output terminal (Iout) of the first 2-wire sensor 1302 is connected to the first analog current signal input (IL-1) of the wiring bay 1008. And, the output terminal (Iout) of the second 2-wire sensor 1304 is connected to the second analog current signal input (IL-2) of the wiring bay 1008. Although not shown, a third 2-wire sensor may be connected in a similar manner to the third analog current signal input (IL-3).

In another example, a 4-wire sensor 1306 (e.g., a 4-wire pressure sensor) is shown as being connected to the differential voltage input (VP-3, VN-3) of the wiring bay 1008. The power supply terminal (VS+) of the 4-wire sensor 1306 is connected to a power supply output (V+sen) of the wiring bay 1008 to provide power to the sensor 1306. The reference voltage terminal (0V) of the 4-wire sensor 1306 is connected to a ground terminal (GND) of the wiring bay 1008. And, the positive and negative differential voltage output terminals (Vout(+), Vout(−)) of the 4-wire sensor 1306 are connected to the positive and negative analog sensor differential voltage inputs (VP-3, VN-3) of the wiring bay 1008.

In another example, a 3-wire sensor 1308 (e.g., a 3-wire pressure sensor) is shown as being connected to an analog voltage signal input (VP-1) of the wiring bay 1008. The power supply terminal (VS+) of the 3-wire sensor 1308 is connected to a power supply output (V+sen) of the wiring bay 1008 to provide power to the sensor 1308. The reference voltage terminal (0V) of the 3-wire sensor 1308 is connected to a ground terminal (GND) of the wiring bay 1008. And, the voltage output terminal (Vout) of the 3-wire sensor 1308 is connected to the analog voltage signal input (VP-1) of the wiring bay 1008. Although not shown, a second 3-wire sensor may be connected in a similar manner to the second analog voltage signal input (VP-2).

In addition, an external power source 1310 (e.g., a battery) is connected to the external power supply connection (PWR+, GND) of the wiring bay 1008 to provide power to the network edge device and the sensors.

Figure 14:
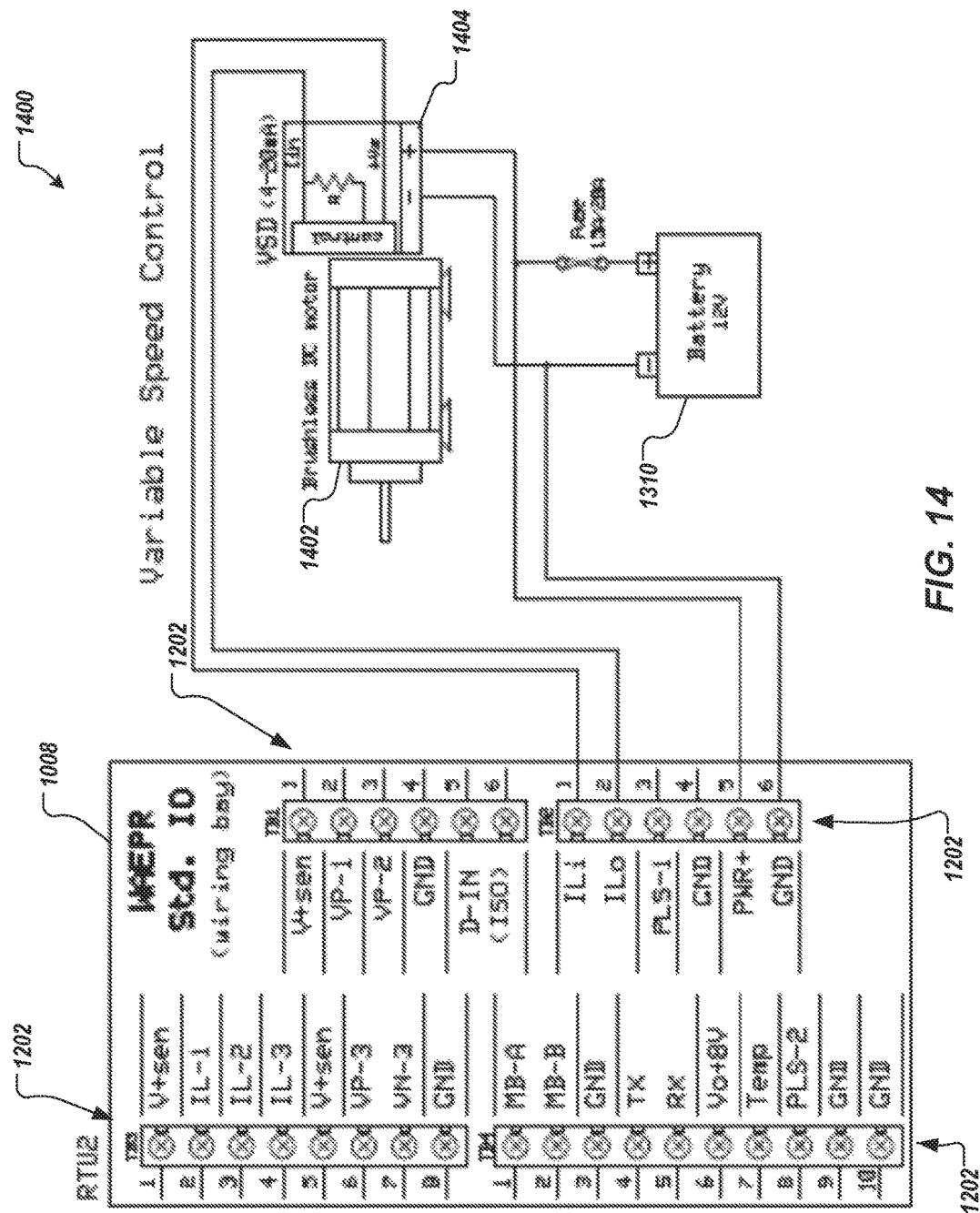
FIG. 14 depicts a diagram of an example wiring configuration for connecting an operational asset to control interfaces of a network edge device.

FIG. 14 depicts a diagram 1400 of an example wiring configuration for connecting an operational asset to control interfaces of a network edge device. The diagram 1400 illustrates a wiring configuration for connecting a motor 1402 with a motor controller 1404 to the wiring bay 1008 of a network edge device. For example, the motor 1402 can be connected to the network edge device so that the network edge device can control the operation of the motor 1402. For example, motor controller 1404 is shown as being connected to the analog control signal interface (ILi, ILo) of the wiring bay 1008. The analog control signal interface (ILi, ILo) includes an analog loop control current input (ILi) and an analog loop control current output (ILo). The loop control input terminal (Iin) of the motor controller 1404 is connected to the analog loop control current input (ILi) of the analog control signal interface (ILi, ILo) on the wiring bay 1008. The power supply voltage terminal (+Vs) of the motor controller 1404 is connected to the analog loop control current output (ILo) of the analog control signal interface (ILi, ILo) on the wiring bay 1008. In addition, an external power source 1310 (e.g., a battery) can be connected to the external power supply connection (PWR+, GND) of the wiring bay 1008 and to the motor controller 1404 to provide power to the network edge device and the motor 1402.

Figure 15:
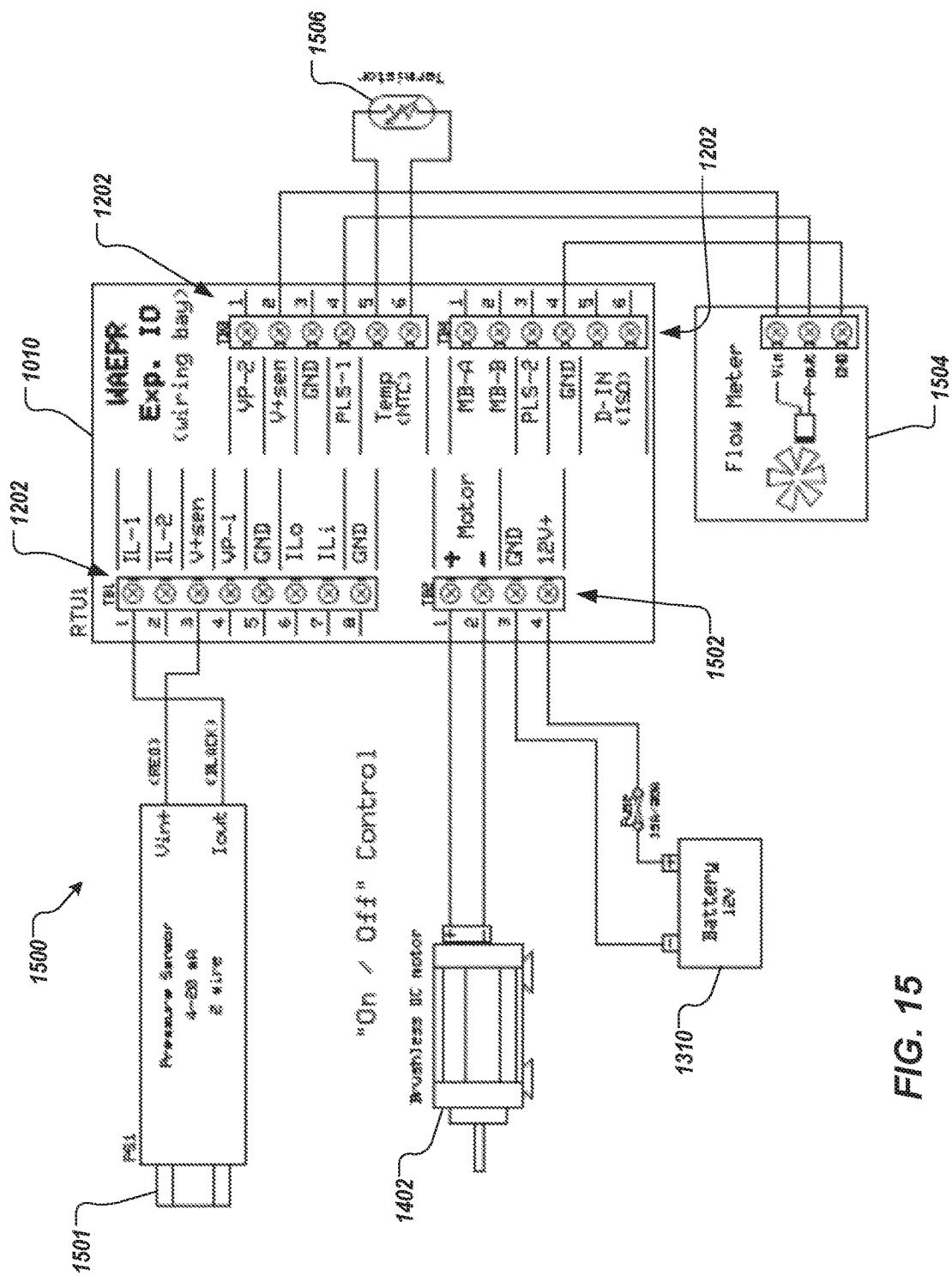
FIG. 15 depicts a diagram of an example wiring configuration for connecting an operational asset to an expansion module of a network edge device.

FIG. 15 depicts a diagram 1500 of an example wiring configuration for connecting an operational asset to an expansion module of a network edge device. The diagram 1500 shows a motor 1402 and associated sensors (2-wire pressure sensor 1501, flow meter 1504, and thermistor 1506) connected to an I/O expansion board 1010 of a network edge device. The I/O expansion board 1010 includes a motor controller interface 1502 and several rows of various other I/O interfaces 1202. The example I/O interfaces 1202 of the I/O expansion board 1010 include (from top left to bottom right) analog current signal inputs (IL-1, IL-2), a power supply output (V+sen), an analog voltage signal input (VP-1), a ground or reference voltage connection (GND), an analog control signal interface (ILi, ILo), another ground or reference voltage connection (GND), a motor controller interface 1502, another analog voltage signal input (VP-2), another power supply output (V+sen), another ground or reference voltage connection (GND), a pulse counter input (PLS-1), a thermistor input (Temp), an RS485 serial data interface (MB-A, MB-B), another pulse counter input (PLS-2), another ground or reference voltage connection (GND), and a digital signal input (D-IN). The motor controller interface 1502 includes, but is not limited to including, a switched motor power interface (Motor+, Motor−) and an external power supply connection (PWR+, GND). In some examples, the switched motor power interface (Motor+, Motor−) can include a solid state power switching relay.

In the example wiring configuration shown, the 2-wire pressure sensor 1501 is connected to the first analog current signal input (IL-1) of the I/O expansion board 1010. The power supply terminal (Vin+) of the 2-wire pressure sensor 1501 is connected to one of the power supply outputs (V+sen) of the I/O expansion board 1010 to provide power to the sensor 1501. The output terminal (Iout) of the 2-wire pressure sensor 1501 is connected to the first analog current signal input (IL-1) of I/O expansion board 1010.

The motor 1402 and an external power source 1310 are connected to the motor controller interface 1502. The positive and negative power terminals (+, −) of the motor 1402 are each, respectively, connected to the positive and negative terminals of the switched motor power interface (Motor+, Motor−). The external power source 1310 is connected to the external power supply connection (PWR+, GND) of the I/O expansion board 1010.

The flow meter 1504 is connected to the first pulse counter input (PLS-1) of the I/O expansion board 1010. The power supply terminal (Vin+) the flow meter 1504 is connected to one of the power supply outputs (V+sen) of the I/O expansion board 1010 to provide power to the flow meter 1504. The pulse output terminal (P-out) of the flow meter 1504 is connected to the first pulse counter input (PLS-1) of the I/O expansion board 1010. And, the ground terminal (GND) of the flow meter 1504 is connected to one of the ground connections (GND) of the I/O expansion board 1010.

The terminals of the thermistor 1506 are each connected to a terminal of the thermistor input (Temp) of the I/O expansion board 1010.

Figure 16:
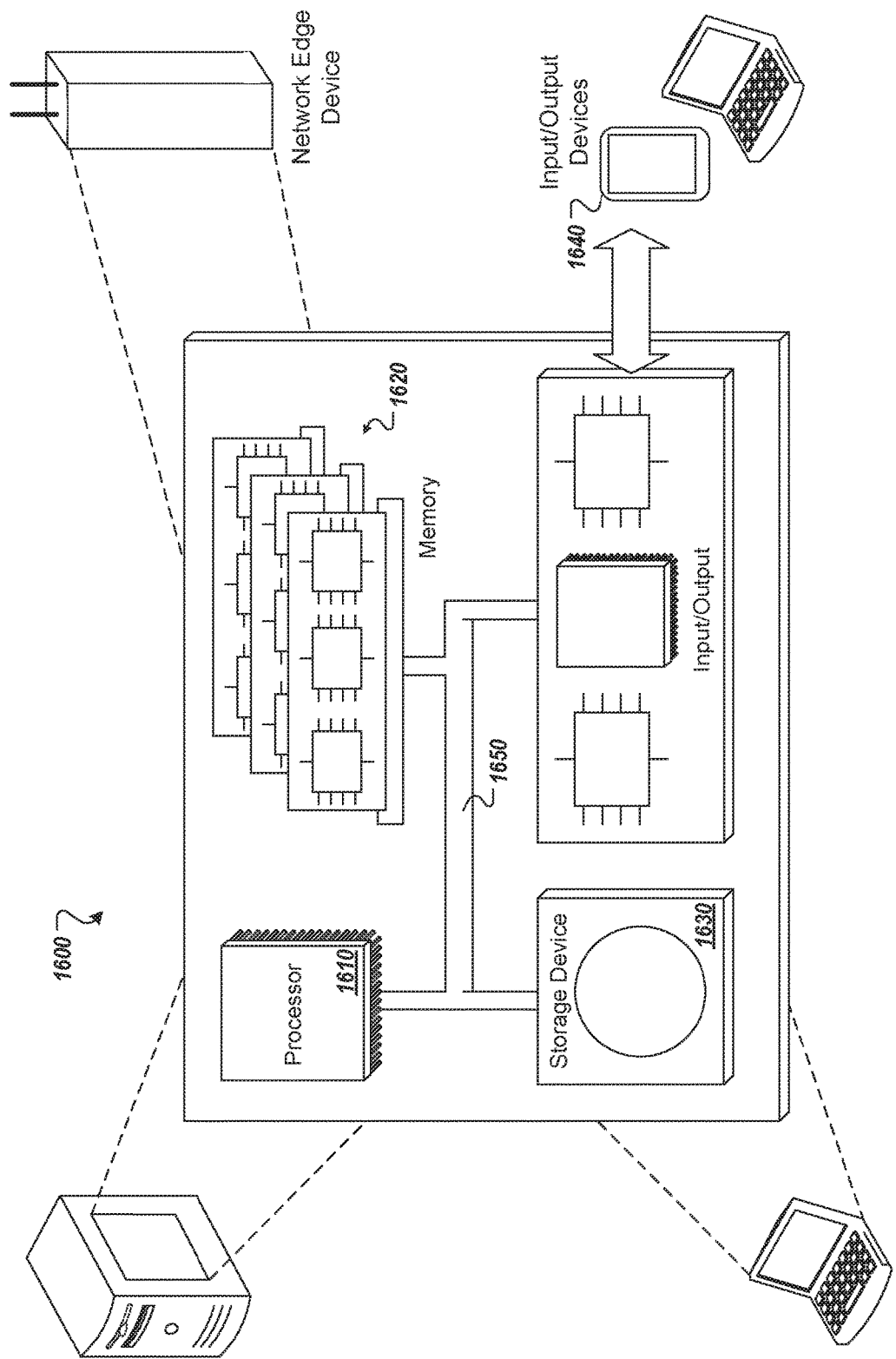
FIG. 16 is a schematic illustration of example computer systems that can be used to execute implementations of the present disclosure Like reference symbols in the various drawings indicate like elements.

FIG. 16 is a schematic illustration of example computer systems 1600 that can be used to execute implementations of the present disclosure. The system 1600 can be used for the operations described in association with the implementations described herein. For example, the system 1600 may be included in any or all of the computing components discussed herein to include network edge devices. The system 1600 includes a processor 1610, a memory 1620, a storage device 1630, and an input/output device 1640. Each of the components 1610, 1620, 1630, 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit. The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device. The input/output device 1640 provides input/output operations for the system 1600. In one implementation, the input/output device 1640 includes a keyboard and/or pointing device. In another implementation, the input/output device 1640 includes a display unit for displaying graphical user interfaces.

Implementations of the subject matter and the operations described in this specification can be realized in digital electronic circuitry, or in computer software, firmware, or hardware, including the structures disclosed in this specification and their structural equivalents, or in any appropriate combinations thereof. Implementations of the subject matter described in this specification can be realized using one or more computer programs, i.e., one or more modules of computer program instructions, encoded on computer storage medium for execution by, or to control the operation of, data processing apparatus, e.g., one or more processors. In some examples, program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. In some examples, the data processing apparatus can include special purpose logic circuitry, e.g., an FPGA (field programmable gate array) or an ASIC (application specific integrated circuit). In some examples, the data processing apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a mesh network, a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A network edge device for communicating between an operational asset and a backend network, the device comprising:
   a housing;
   a control board inside the housing comprising:
     one or more processors;
     a memory device coupled to the one the one or more processors and having instructions stored thereon;
     a wiring bay comprising a plurality of different types of wiring interfaces for connecting an operational asset to the network edge device, the wiring interfaces coupled to the one or more processors; and
     a communication interface port coupled to the one or more processors and configured to receive a detachable radio frequency (RF) modem board that comprises one of two or more different types of RF modems,
   wherein the instructions, when executed by the one or more processors, cause the one or more processors to perform operations comprising:
     automatically identifying a type of an RF modem on an RF modem board that is connected to the communication interface port,
     receiving, from at least one of the wiring interfaces, first data from an operational asset connected to the at least one of the wiring interfaces, the first data formatted according to a first data format that is specific to the operational asset,
     processing the first data according to an asset template to generate second data, the second data including the first data and being formatted according to a second data format that is specific to a backend network, and
     causing the second data to be transmitted to the backend network by the RF modem by
     communicating with the RF modem according to a communication protocol specific to the type of the RF modem.

2. The device of claim 1, wherein the two or more different types of RF modems comprise a satellite modem, a cellular modem, and a random phase multiple access (RPMA) modem.

3. The device of claim 1, wherein the plurality of wiring interfaces include a serial data communication interface, an analog signal input interface, an analog signal output interface, and a digital signal input interface.

4. The device of claim 1, wherein the plurality of wiring interfaces include serial data communication interfaces, an analog current signal input interface, an analog current signal output interface, an analog voltage signal input interface, a pulse signal input interface, a digital signal input interface, and a temperature sensor input interface.

5. The device of claim 1, wherein the control board comprises an input/output expansion port for receiving a detachable input/output expansion board.

6. The device of claim 5, wherein the input/output expansion board includes a motor controller.

7. The device of claim 1, wherein the network edge device meets a National Electric Code (NEC) classification for an explosion proof device in an explosive gas area.

8. The device of claim 1, wherein the operations comprise:
   receiving, from the RF modem, instructions from the backend network to change an operating parameter of the operational asset;
   causing a control signal to be generated, based on the asset template, to change the operating parameter of the operational asset in accordance with the instructions, the control signal being formatted according to a control format specific to the operational asset; and
   causing the control signal to be transmitted to the operational asset through the at least one of the wiring interfaces.

9. The device of claim 1, wherein the first data format includes analog voltage or current levels.

10. The device of claim 1, wherein the first data format includes a digital data format specific to the operational asset.

11. The device of claim 1, wherein receiving the first data comprises receiving a portion of the first data at each of a plurality of first time intervals,
    wherein the operations further comprise storing each portion of the first data, and
    wherein the second data is caused to be transmitted at an end of a second time interval, the second time interval being of a longer period of time than each of the first time intervals.

12. The device of claim 11, wherein the operations further comprise causing the network edge device to enter a low power mode between each of the first time intervals.

13. The device of claim 1, wherein the operations comprise:
    determining, based on the first data and the asset template, to change an operating parameter of the operational asset;
    causing a control signal to be generated, in accordance with the asset template, to change the operating parameter of the operational asset, the control signal being formatted according to a control format specific to the operational asset; and causing the control signal to be transmitted to the operational asset through the at least one of the wiring interfaces.

14. The device of claim 1, wherein the network edge device is operating in a first mode in which changes to operating parameters of the operational asset are controlled by instructions from the backend network,
    wherein the operations comprise:
    determining that communications with the backend network have been lost;
    shifting the network edge device to operate in a second mode in changes to operating parameters of the operational asset are controlled by the network edge device in accordance with the asset template.

15. The device of claim 1, wherein the asset template identifies:
    the first data format for data received from the operational asset,
    the second data format for data to be sent to the backend network,
    a control signal format of control signals for controlling operating parameters the operational asset,
    criteria for controlling operating parameters of the operational asset, and
    alarm values associated with parameters of the operational asset.

16. A network edge device for communicating between an operational asset and a backend network, the device comprising:
    a housing;
    a control board inside the housing comprising:
    one or more processors;
    a memory device coupled to the one the one or more processors and having instructions stored thereon;
    a wiring bay comprising a plurality of different types of wiring interfaces for connecting an operational asset to the network edge device, the wiring interfaces coupled to the one or more processors; and
    a communication interface port coupled to the one or more processors and configured to receive a detachable radio frequency (RF) modem board that comprises one of two or more different types of RF modems,
    wherein the instructions, when executed by the one or more processors, cause the one or more processors to perform operations comprising:
    automatically identifying a type of an RF modem on an RF modem board that is connected to the communication interface port,
    establishing communication with a backend network through a first network connection by communicating with the RF modem according to a communication protocol specific to the type of the RF modem
    establishing communication with a user computing device through a second, different network connection,
    receiving an asset template that identifies communication protocols of the backend network and communication protocols of an operational asset to which the network edge device is coupled through the second network connection, and
    in response to receiving an instruction from the user computing device, sending, using the RF modem, registration data to the backend network to register the network edge device and the operational asset with the backend network.

17. The device of claim 16, wherein the asset template facilitates communication between the operational asset and the backend network while permitting the operational asset to be agnostic to communication protocols of the backend network and permitting the backend network to be agnostic to the communication protocols of the operational asset.

18. The device of claim 16, wherein the first network connection is one of a cellular network connection, a satellite network connection, or a random phase multiple access (RPMA) network connection, and wherein the second network connection is a low-power local network connection.

19. The device of claim 16, wherein the operations further comprise determining a type of the operational asset; and requesting an asset template that is specific to the determined type of the operational asset.

* * * * *

UNITED STATES PATENT AND TRADEMARK OFFICE
CERTIFICATE OF CORRECTION

PATENT NO. : 10,372,116 B2
APPLICATION NO. : 15/473241
DATED : August 6, 2019
INVENTOR(S) : David Figoli and Matthew Harrison It is certified that error appears in the above-identified patent and that said Letters Patent is hereby corrected as shown below:

In the Claims

Column 37, Line 44, Claim 1, delete "the one the one" and insert -- the one --, therefor.

Column 39, Line 25, Claim 15, after "parameters" insert -- of --.

Column 39, Line 36, Claim 16, delete "the one the one" and insert -- the one --, therefor.

Column 40, Line 13, Claim 16, delete "modem" and insert -- modem, --, therefor.

Signed and Sealed this
Twenty-ninth Day of October, 2019

Andrei Iancu
*Director of the United States Patent and Trademark Office*